(12) United States Patent
Knapp et al.

(10) Patent No.: US 8,769,046 B2
(45) Date of Patent: Jul. 1, 2014

(54) METHODS AND APPARATUS FOR USING MULTIPLE WIRELESS LINKS WITH A WIRELESS TERMINAL

(75) Inventors: Edward Knapp, Basking Ridge, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1194 days.

(21) Appl. No.: 11/386,457

(22) Filed: Mar. 22, 2006

(65) Prior Publication Data

US 2006/0218298 A1  Sep. 28, 2006

Related U.S. Application Data

(60) Provisional application No. 60/664,501, filed on Mar. 23, 2005.

(51) Int. Cl.
*G06F 15/16* (2006.01)

(52) U.S. Cl.
USPC ........... 709/218; 709/222; 709/223; 709/227; 709/245; 709/260

(58) Field of Classification Search
USPC ........... 709/218, 222, 223, 227, 245; 375/260
See application file for complete search history.

(56) References Cited

U.S. PATENT DOCUMENTS

| | | | |
|---|---|---|---|
| 5,103,459 A | | 4/1992 | Gilhousen et al. |
| 5,488,632 A | * | 1/1996 | Mason et al. ................. 375/260 |
| 5,507,035 A | | 4/1996 | Bantz et al. |
| 5,978,365 A | | 11/1999 | Yi |
| 6,005,855 A | | 12/1999 | Zehavi et al. |
| 6,112,088 A | | 8/2000 | Haartsen |
| 6,216,004 B1 | | 4/2001 | Tiedemann, Jr. et al. |
| 6,359,865 B1 | | 3/2002 | Toskala et al. |
| 6,381,458 B1 | | 4/2002 | Frodigh et al. |

(Continued)

FOREIGN PATENT DOCUMENTS

| | | |
|---|---|---|
| CA | 2501473 A1 | 5/2004 |
| JP | 2003235069 A | 8/2003 |

(Continued)

OTHER PUBLICATIONS

International Search Report and Written Opinion With Notification of Transmittal, pp. 1-10 dated Jul. 14, 2006 from PCT application No. PCT/US2006/010493.

(Continued)

*Primary Examiner* — Lan-Dai T Truong
(74) *Attorney, Agent, or Firm* — Donald C. Kordich

(57) ABSTRACT

Mobile nodes support simultaneous OFDM links with multiple points of network attachment. A MN may simultaneously use multiple IP addresses, allowing packets addressed to the mobile to be routed over different paths. Alternatively, the MN may have a single IP address with packets corresponding to different applications, e.g., identified by packet header information, being routed over different paths. Thus packets corresponding to one application, e.g., a voice application, may be routed over one wireless link while packets corresponding to another application, e.g., a data application such as E-mail, may be routed over another wireless link, while packets corresponding to still another application, e.g., a broadcast TV service may be communicated over another wireless link. The direction of communication, latency, reliability and other QoS characteristics of the different wireless links may be considered in path selection to provide MN's user with cost effective service while still meeting minimum application requirements.

73 Claims, 12 Drawing Sheets

(56) References Cited

U.S. PATENT DOCUMENTS

| | | | |
|---|---|---|---|
| 6,487,393 | B1 | 11/2002 | Davenport et al. |
| 6,487,406 | B1 | 11/2002 | Chang et al. |
| 6,611,231 | B2 | 8/2003 | Crilly et al. |
| 6,639,898 | B1 | 10/2003 | Dutta et al. |
| 6,928,062 | B2 | 8/2005 | Krishnan et al. |
| 7,016,651 | B1 * | 3/2006 | Narasimhan ............... 455/67.11 |
| 7,415,059 | B2 | 8/2008 | Chadha et al. |
| 7,551,546 | B2 | 6/2009 | Ma et al. |
| 7,634,234 | B2 * | 12/2009 | Karabinis ................. 455/67.11 |
| 7,668,265 | B2 * | 2/2010 | Balakrishnan et al. ....... 375/346 |
| 8,325,693 | B2 | 12/2012 | Hazani et al. |
| 2002/0086692 | A1 | 7/2002 | Chheda et al. |
| 2002/0097668 | A1 | 7/2002 | Izumi |
| 2002/0137464 | A1 | 9/2002 | Dolgonos et al. |
| 2003/0043773 | A1 | 3/2003 | Chang |
| 2003/0152053 | A1 * | 8/2003 | Evans et al. ................. 370/338 |
| 2003/0169716 | A1 | 9/2003 | Saito |
| 2004/0081191 | A1 * | 4/2004 | Kwon et al. ................. 370/431 |
| 2004/0190440 | A1 | 9/2004 | Kim et al. |
| 2004/0190560 | A1 * | 9/2004 | Maltsev et al. .............. 370/503 |
| 2004/0202234 | A1 | 10/2004 | Wang |
| 2005/0190849 | A1 | 9/2005 | McNamara |
| 2006/0002344 | A1 | 1/2006 | Ono et al. |
| 2006/0072524 | A1 * | 4/2006 | Perahia et al. ................ 370/338 |
| 2006/0088114 | A1 * | 4/2006 | Chen et al. ................... 375/260 |
| 2006/0114857 | A1 * | 6/2006 | Czaja et al. .................. 370/335 |
| 2006/0279435 | A1 * | 12/2006 | Krishnan et al. ................ 341/29 |
| 2007/0064825 | A1 * | 3/2007 | Izumi .......................... 375/260 |
| 2007/0104280 | A1 | 5/2007 | Ibrahim et al. |
| 2007/0206693 | A1 * | 9/2007 | Geile et al. ................... 375/260 |
| 2007/0253322 | A1 * | 11/2007 | Geile et al. ................... 370/208 |
| 2008/0165671 | A1 * | 7/2008 | Larsson ....................... 370/204 |
| 2009/0034640 | A1 * | 2/2009 | Sondur ......................... 375/260 |
| 2009/0034644 | A1 * | 2/2009 | Sandhu ........................ 375/267 |
| 2009/0311995 | A1 * | 12/2009 | Himmelstein ............. 455/414.1 |

FOREIGN PATENT DOCUMENTS

| | | |
|---|---|---|
| JP | 2005500760 | 1/2005 |
| WO | WO 01/30039 A1 | 4/2001 |
| WO | 2004025982 A1 | 3/2004 |
| WO | 2004105272 A1 | 12/2004 |
| WO | WO2004104530 | 12/2004 |

OTHER PUBLICATIONS

Notification of Transmittal of the International Preliminary Report on Patentability and the International Preliminary Report on Patentability, pp. 1-6 dated Feb. 23, 2007 from PCT application No. PCT/US2006/010493.

PCT International Search Report, for International Application No. PCT/US2006/010493, pp. 1-4 Jul. 7, 2006.

Hideaki, et al., "A Study of Mobile Adaptive Path Switching Control System," Technical Research Report at Conference of the Institute of Electronics 2004, vol. 103 (692), 279-282.

Hideaki, et al., "A Study of Mobile Adaptive Path Switching Control System," Technical Research Report at Conference of the Institute of Electronics,, 2004, vol. 103 (692), 279-282.

Taiwan Search Report—TW095110123—TIPO—Nov. 8, 2013.

* cited by examiner

METHODS AND APPARATUS FOR USING MULTIPLE WIRELESS LINKS WITH A WIRELESS TERMINAL

RELATED APPLICATION

The present application claims the benefit of U.S. Provisional Patent Application Ser. No. 60/664,501, filed Mar. 23, 2005 which is hereby expressly incorporated by reference.

FIELD OF THE INVENTION

The present invention relates to methods and apparatus for supporting communications with wireless terminals and, more particularly, to methods and apparatus for use with mobile nodes capable of supporting multiple simultaneous wireless links.

BACKGROUND

The use of wireless communication devices and the demand for wireless communications based access to internet services continues to increase. Service providers are continually deploying advanced access technologies such as, CDMA, and TDMA and now OFMDA to offer innovative new services to consumers. Advances in the number and type of network nodes is leading to increased use of wireless networks by consumers and business users resulting in increased revenues. As more types of packet data applications become widely available to wireless terminal users, e.g., various types of wireless internet services and/or downlink broadcast services in additional to more conventional wireless voice services, there is a growing need for more advanced wireless terminals, e.g., mobile node, apparatus and methods to support multiple services from multiple sources in an efficient manner. The overall air link resources, e.g., frequency spectrum, available for wireless communication use is limited; therefore, efficient use of such resources for the various competing users and applications becomes a very significant consideration, particularly as demand for those limited resources continues to increase. In addition, service providers may desire to be able to offer wireless terminal users the ability to simultaneously execute multiple applications from a single communications device, and those different applications may have different needs, e.g., in terms of latency requirements, data rates needs, direction of data flow, and/or quality of service parameters. In addition, data corresponding to different applications may be best made available from different wireless access resources, e.g., using different carrier frequencies or subbands of a wideband channel creating a need for flexible delivery methods.

In view of the above, there is a need for wireless communication methods and apparatus that support multiple applications operating concurrently on the same wireless communications device. In addition, methods and apparatus that support a mobile wireless terminal simultaneously operating over multiple communication links would be advantageous. It would also be beneficial if such methods and apparatus consider different application needs, different wireless link quality, and/or different user service levels to promote efficiency.

SUMMARY

Mobile nodes (MNs) can support simultaneous operation with multiple points of network attachment. The mobile nodes may, but need not be, implemented as wideband mobile nodes. The different network attachment points may be different Base Stations (BS) or different points of network attachment at the same base station e.g., sectors. The different points of network attachment at a single base station may include circuitry or modules to support different communications frequencies and/or subbands which correspond to different sectors of the base station. Different points of network attachment may be identified by using one or more different identifiers. The different identifiers may be, e.g., different base station identifiers, sector identifiers, and/or carrier frequency identifiers (e.g., beacons and/or pilots). Multiple wireless links, with multiple corresponding BS attachment points, may be operated simultaneously as the mobile moves about the network. In various embodiments, the exemplary MN includes two receiver chains and two transmitter chains. In other embodiments a single radio receiver and/or transmit chain may be used with separate digital signal processing being used to recover and/or generate symbols transmitted on tones used to communicate with different network attachment points.

In accordance with various embodiments, a MN may use, at the same time, multiple IP addresses assigned to the mobile, allowing packets addressed to the mobile using the mobile's different addresses, to be routed over different communications paths, e.g., different wireless communications links corresponding to different BSs and/or BS sectors which may be implemented using the same or different carrier frequencies. The different IP addresses assigned to a MN, may correspond to the same Home Agent node or different Home Agent nodes. Instead of being assigned multiple IP addresses, the MN may have a single IP address assigned to it with packets corresponding to different applications, e.g., identified by header information in a packet, being routed over different communications paths and wireless communications links to the MN. Thus, in accordance with various embodiments, packets corresponding to one application, e.g., a voice application, may be routed over one wireless communications link while packets corresponding to another application, e.g., a data application such as E-mail, may be routed over another wireless communications link while packets corresponding to still yet another application, e.g., a broadcast TV service may be communicated over another wireless communications link. The direction of communication, latency, reliability and other quality of service characteristics of the different communications paths (e.g., wireless links) may be selected to provide the user of the MN cost effective service with regard to a given application while still meeting the minimum requirements of the application. Thus, voice may be sent over a low latency wireless communications link to a mobile with E-mail being sent over, e.g., a less costly wireless link that may be subject to higher latency, and broadcast services over a one way transmission. Since the MN can support multiple wireless communications links with different network points of attachment at the same time, such an approach to providing service offers the user benefits in terms of cost and/or convenience by matching an application's particular needs to the applications requirements given the available network service levels and/or loading conditions. For example, a WIFI communications link can be used for some applications with a link based on another communications standard being used to support another type of application, e.g., a video broadcast application.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
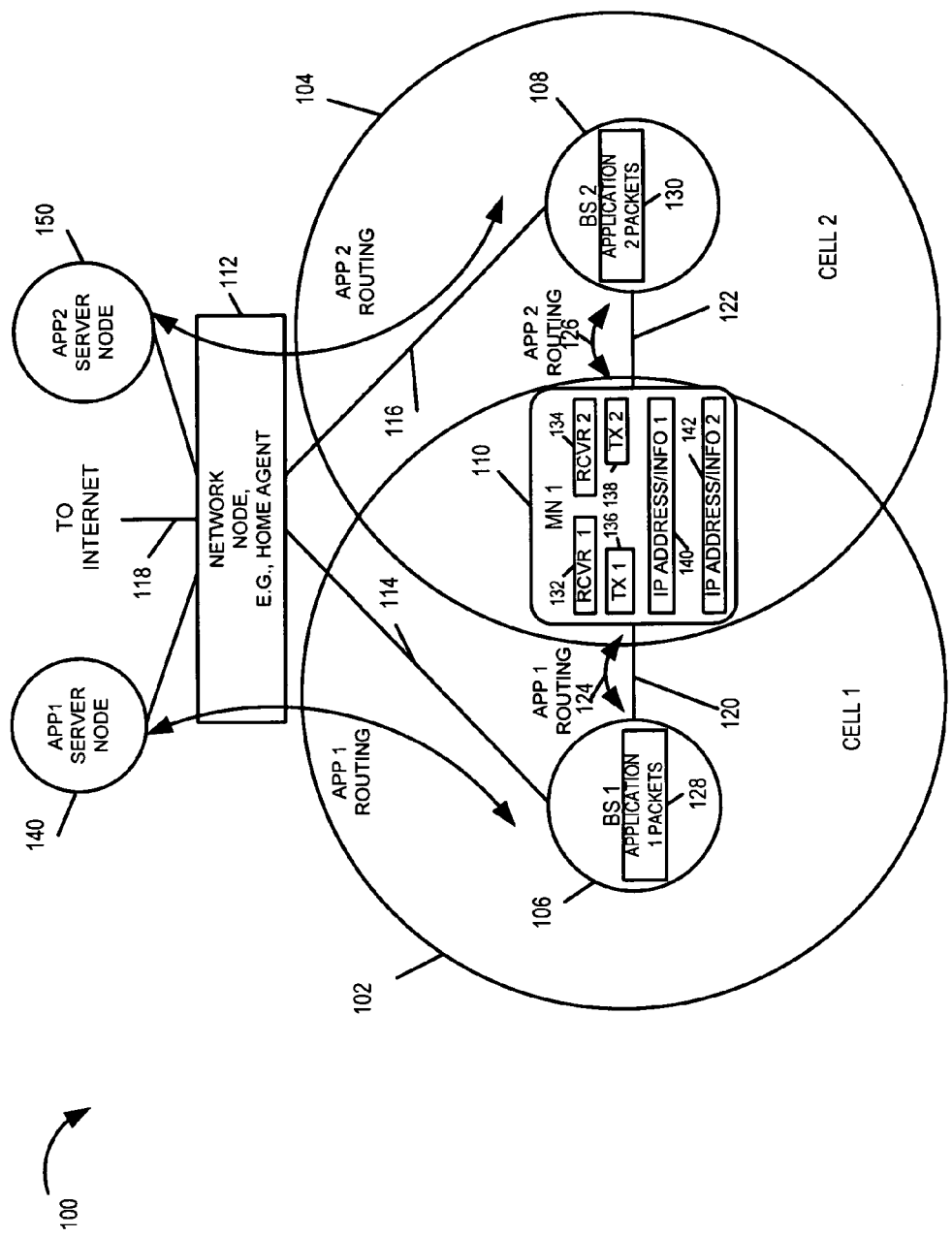
FIG. 1 illustrates an exemplary communications system implemented in accordance with various embodiments

FIG. 1 illustrates an exemplary communications system 100 implemented in accordance with various embodiments. Exemplary communications system 100 may be, e.g., an orthogonal frequency division multiplexed (OFDM) wireless communications system. Exemplary communications system 100 includes a plurality of cells (cell 1 102, cell 2 104). Each cell (102, 104) represents a wireless coverage area for a corresponding base station (BS 1 106, BS 2 108), respectively. The BSs (106, 108) are coupled to network node 112, e.g., a router, via network links (114, 116), respectively. Network node 112 is coupled to network node, e.g., other base stations, home agent nodes, AAA server nodes, applications server nodes, and/or the Internet via network link 118. Network links 114, 116, 118 may be, e.g., fiber optic links.

System 100 also includes a plurality of wireless terminals, e.g., mobile nodes (MNs). At least some of the support simultaneous operation with multiple points of network attachment. The different network attachment points may be different bases stations, or different points of network attachment at the same base station. The different points of network attachment at a single base station may include circuitry or modules which support different communications frequencies and/or which correspond to different communications sectors of a cell serviced by a base station. Different points of network attachment may be identified by using one or more different identifiers. The different identifiers may be, e.g., different base station identifiers, sector identifiers, and/or carrier frequency identifiers. Exemplary MN, MN1 110, may, but need not be, implemented as a high performance MN. MN 110 may move throughout the system 100 and establish a wireless link or links with one or more BSs. Multiple wireless links, with multiple corresponding BS attachment points, may be operated simultaneously. MN 110 includes two receiver chains (receiver chain 1 132, receiver chain 2 134) and two transmitter chains (transmitter chain 1 136, transmitter chain 2 138). In accordance with various embodiments, an MN may use, at the same time, multiple IP addresses assigned to the mobile, allowing packets addressed to the mobile using the mobile's different addresses, to be routed over different communications paths, e.g., different wireless communications links corresponding to different BSs and/or BS sectors which may be implemented using the same or different carrier frequencies. The different IP addresses assigned to an MN 110, may correspond to the same Home Agent node or different Home Agent nodes. Instead of being assigned multiple IP addresses, the MN 110 may have a single IP address assigned to it with packets corresponding to different applications, e.g., identified by header information in a packet, being routed over different communications paths and wireless communications links to the MN 110. Thus, in accordance with various embodiments, packets corresponding to one application, e.g., a voice application, may be routed over one wireless communications link while packets corresponding to another application, e.g., a data application such as E-mail, may be routed over another wireless communications link while packets corresponding to still another application, e.g., a broadcast TV service may be communicated over another wireless communications link. The direction of communication, latency, reliability and other quality of service characteristics of the different communications paths (e.g., wireless links) may be selected to provide the user of the MN cost effective service with regard to a given application while still meeting the minimum requirements of the application. Thus, voice may be sent over a low latency wireless communications link to a mobile with E-mail being sent over, e.g., a less costly wireless link that may be subject to higher latency, and broadcast services over a one way transmission. Since the MN 110 can support multiple wireless communications links with different network points of attachment at the same time, such an approach to providing service offers the user benefits in terms of cost and/or convenience by matching an application's particular needs to the applications requirements given the available network service levels and/or loading conditions.

In the illustrated exemplary system, a first wireless link 120 couples MN1 110 to BS 1 106; IP address/information 1 140 included in MN 1 110 corresponds to the addressing used for application 1 routing signaling 124. MN 110 is shown using receiver chain 1 132 to receive downlink signals from BS 1 106 over wireless link 120; MN 110 is shown using transmitter chain 1 136 to transmit uplink signals over wireless link 120 to BS 1 106. A second wireless link 122 couples MN1 110 to BS 2 108; IP Address/information 2 142 included in MN 1 110 corresponds to the addressing used for application 2 routing signaling 126. MN 110 is shown using receiver chain 2 134 to receive downlink signals from BS 2 108 over wireless link 122; MN 110 is shown using transmitter chain 2 138 to transmit uplink signals over wireless link 122 to BS 2 108.

Application 1 packets 128 shown in BS 1 106 represent an intermediate point of packet flow between MN 1 110 and another end point, e.g., an application 1 server node 140; the packet flow path including wireless link 120 and network link 114. Application 2 packets 130 shown in BS 2 108 represent an intermediate point of packet flow between MN 1 110 and another end point, e.g., an application 2 server node 150; the path including wireless link 122 and network link 116. In FIG. 1 network links 114, 116 are shown coupled to the same network node 112, though which packets from application servers 140, 150 are routed. The routing in network node 112 diverges depending on which address corresponding to the MN is used and/or which application sent the packet. Application identification information may be included in a header of the packet. Node 112 may be a node which serves as the MN's Home Agent. In such an embodiment, the node 112 is responsible for redirecting packets to the MN 110 as it moves through out the network establishing wireless links. Various exemplary applications which may be supported by one or both servers 140, 150 include: video download services, e.g., movies on demand, music download services, audio download services, various Internet services, interactive gaming, data storage, data retention, data processing, video conferencing, E-mail, broadcast video and voice over Internet Protocol (VoIP).

Figure 2:
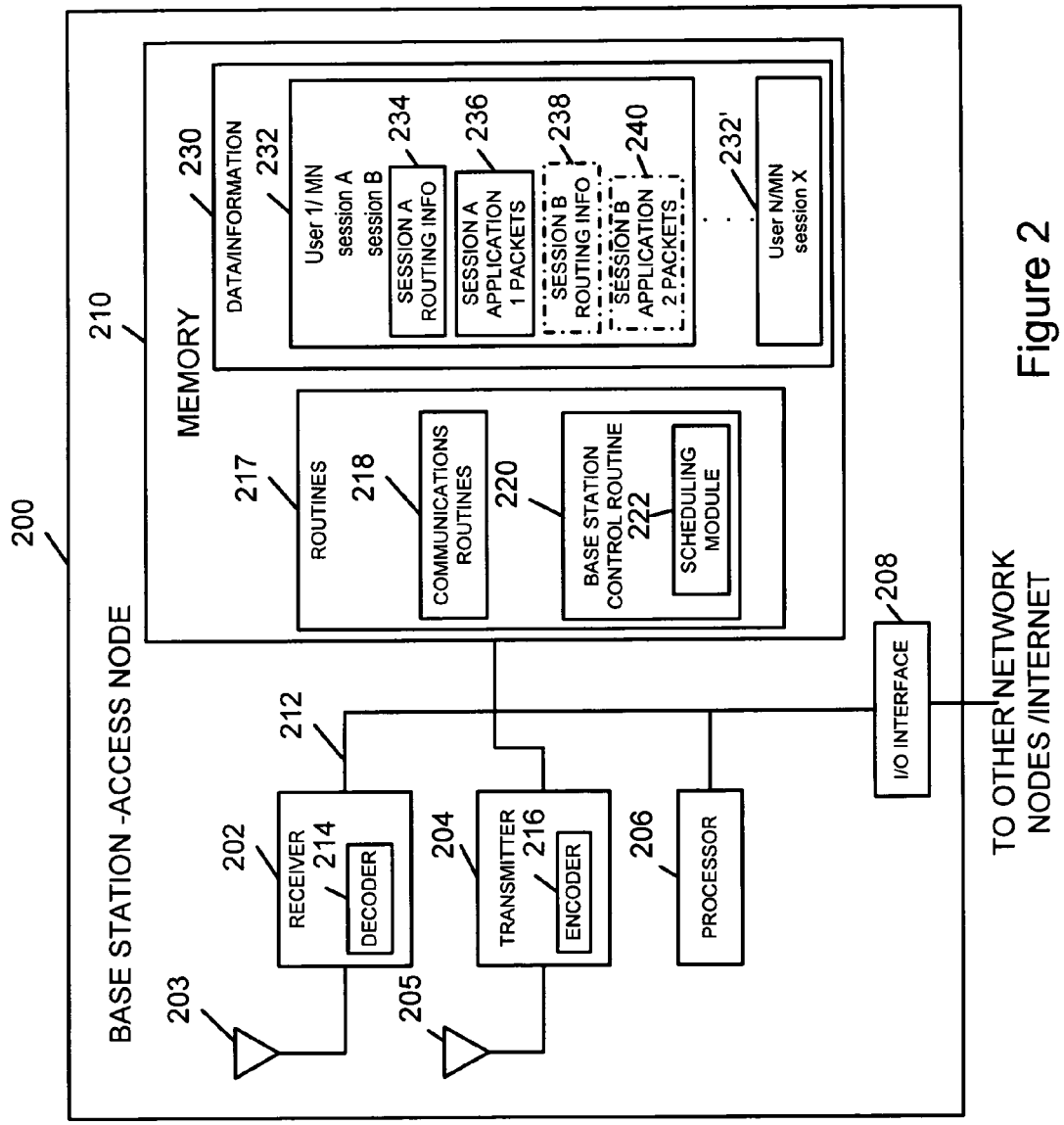
FIG. 2 illustrates an exemplary base station-access node.

FIG. 2 illustrates an exemplary base station-access node 200. Exemplary base station 200 may be any of the BSs 106, 108 of the system 100 of FIG. 1. Base station 200 includes a receiver 202, a transmitter 204, a processor 206, e.g., CPU, an I/O interface 208, and memory 210. The various elements 202, 204, 206, 208, 210 are coupled together via bus 212 over which the various elements can interchange data and information. The base station 200 includes receive antenna 203 coupled to receiver 202 for receiving uplink signals from a plurality of MNs. BS 200 also includes transmit antenna 205 coupled to transmitter 204 for transmitting downlink signals to a plurality of MNs. The receiver module 202 includes a decoder/demodulator 214 while the transmitter module 204 includes an encoder/modulator 216. The I/O interface 208 couples the base station 200 to other network nodes, e.g., other base stations, application server nodes, routers, AAA server nodes, home agent nodes, and to the Internet.

The memory 210 includes routines 217 and data/information 230. The processor 206 executes the routines 217 and uses the data/information 230 in memory 210 to cause the base station 200 to operate. Routines 218 include communications routines 218 used for controlling the base station 200 to perform various communications operations and implement various communications protocols. Routines 217 also include a base station control routine 220 used to control the base station 200 to implement the steps of methods. The base station control routine 220 includes a scheduling module 222 used to control transmission scheduling and/or communication resource allocation. Thus, module 222 may serve as a scheduler.

In accordance with various embodiments, BS 200 may maintain a wireless link with and schedule resources for a MN which is concurrently maintaining another wireless link with a different network point of attachment, such as, e.g., a network point of attachment of an adjacent base station. In some embodiments, BS 200 may establish and maintain multiple simultaneous wireless links with the same MN. For example with respect to the same MN, BS 200 may establish and maintain two wireless links using different carrier frequencies for each wireless link, or BS 200 may establish and maintain two wireless links with different sector attachment points, or BS 200 may establish and maintain two wireless links using the same carrier frequency and the same sector but using different BS assigned identifiers. In some embodiments the MN interacts with the single BS 106 at a point in time with a wideband rx/tx using a single RF chain but multiple digital chains. In one particular broadcast TV application while two downlinks are supported a single uplink is supported by the mobile since second independent uplink is not needed given that the second, e.g., TV application, is a broadcast application which does not require uplink signaling. In some such embodiments, the receiver supports a sufficiently wide frequency band to allow both downlink signals to be received and decoded.

Memory 210 also includes data/information 230 used by communications routines 218 and control routine 220. The data/information 230 includes an entry for each active mobile station user (user 1/MN session A and/or session B data/information 232, user N/MN session X data/information 232') which lists the active sessions being conducted by the user and includes information identifying the mobile terminal (MT) being used by a user to conduct the sessions. Exemplary user 1/MN session information 232 includes: (session A routing information 234 and session A application 1 packets 236) and/or (session B routing information 238 and session B application packets 240). As previously stated, BS 200 may be any of the BSs of system 100 of FIG. 1. For example if BS 200 is BS 1 106 of FIG. 1, then session A routing information 234 and session A application 1 packets 236 are included in BS 200, while session B routing info 238 and session B application 2 packets 240 are omitted. In such a case, session A application 1 packets 236 may be application 1 packets 128 of FIG. 1. Alternatively, if BS 200 represents BS 2 108 of FIG. 1, then session B routing information 238 and session B application 2 packets 240 are included in BS 200, while session A routing info 234 and session A application 1 packets 236 are omitted. In such a case, session B application 2 packets 240 may be application 2 packets 130 of FIG. 1.

Figure 3:
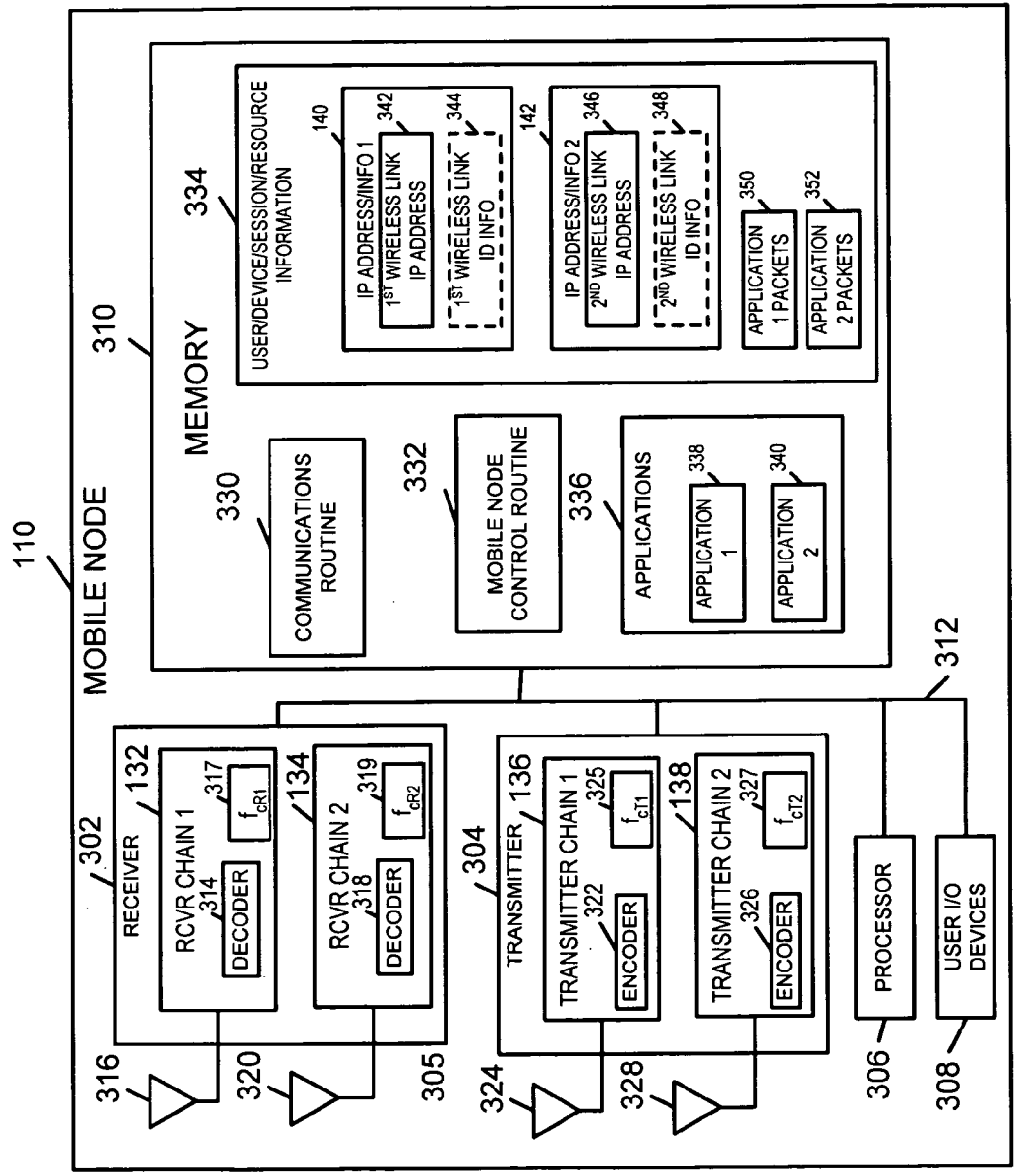
FIG. 3 illustrates an exemplary mobile node (MN).

FIG. 3 illustrates an exemplary mobile node (MN) 110. MN 110 supports the simultaneous operation of two or more wireless links to two or more network attachment points. For example, the two network attachment points may correspond to: two different base stations, two different sectors of the same base station, two different carrier frequencies of the same sector, or two different wireless terminal identifiers corresponding to the same BS, sector, and carrier used. MNs such as 110 may utilize multiple antenna 316, 324 and 320, 328 for establishing wireless links with two different base stations. In addition, MNs may utilize single antenna 316, 324 with a plurality of receiver chains 132, 134 and transmitter chains 136,138 for two different sectors of the same base station, two different carrier frequencies of the same sector, or two different wireless terminal identifiers corresponding to the same BS, sector, and carrier used. In some embodiments, MN 110 uses a single antenna for both receiver and transmitter. The mobile node 110 may be used as a mobile terminal (MT). The mobile node 110 includes a receiver 302, a transmitter 304, a processor 306, user I/O devices 308, and memory 310 coupled together via bus 312 over which the various elements may interchange data and information. Receiver 302 includes a plurality of receiver chains (receiver chain 1 132, receiver chain 2 134). Receiver chain 1 132 is coupled to receive antenna 316, while receive chain 2 134 is coupled to receive antenna 320. Each receiver chain (132, 134) includes a decoder (314, 318), respectively, for decoding received downlink signals which have been encoded by a base station prior to transmission. Each receiver chain (132, 134) can be independently set or tuned to a selected carrier frequency ($f_{cR1}$ 317, $f_{cR2}$ 319), respectively. Transmitter 304 includes a plurality of transmitter chains (transmitter chain 1 136, transmitter chain 2 138). Transmitter chain 1 136 is coupled to transmit antenna 324, while transmitter chain 2 138 is coupled to transmit antenna 328. Each transmitter chain (136, 138) includes an encoder (322, 326), respectively, for encoding uplink signals prior to transmission. Each transmitter chain (136, 138) can be set or tuned to a selected carrier frequency ($f_{cT1}$ 325, $f_{cT2}$ 327), respectively. In some embodiments, receiver chain 1 132 is operated in coordination with transmitter chain 1 136 to establish and maintain a first bi-directional wireless link to a first network attachment point, while receiver chain 2 134 is operated in coordination with transmitter chain 2 138 to establish and maintain a second bi-directional wireless link to a second network attachment point. In some embodiments, each of the receiver chains (132, 134), and transmitter chains (136, 138) employs the same technology, e.g., OFDM technology.

User I/O devices 308, e.g., microphone, keyboard, keypad, mouse, video camera, speaker, display, etc., allow a user of MN 110 to input data/information to be transmitted on the uplink and to access output data/information that has been received on the downlink, e.g., from a peer MN in a communications session with MN 110 and/or from various other sources such as application server nodes. User I/O devices 308, in some embodiments, also includes user I/O ports, allowing the interface to external I/O devices, e.g., cameras, video displays, recording devices, storage devices, audio reproduction device, etc. In some embodiments, different I/O devices and/or different I/O ports may be allocated to different applications being simultaneously supported. For example a microphone and corresponding speaker may be allocated to a VoIP application, while a mouse, keypad, and display may allocated to an interactive video streaming application.

Memory 310 includes routines and data/information. The processor 306, e.g., a CPU, executes the routines and uses the data/information in memory 310 to control the operation of the MN 110. In order to control mobile node 110 operation memory 310 includes communications routine 330, mobile node control routine 332, and applications 336. Communications routine 330 performs various communications operations and implement various communications protocols. Mobile node control routine 332 is used to control the mobile node 110 to operate. Mobile node control routine 332 functions include controlling operation the user I/O devices 308, controlling the transmitter 302, and controlling operation of transmitter 304. Mobile node control routine 332 controls the establishment and maintenance of simultaneous wireless links, e.g., for different applications. Applications 336 includes a plurality of applications (application 1 338, application 2 340) that are supported by the mobile node 110. Various exemplary applications may include: video download services, e.g., movies on demand, music download services, audio download services, various Internet services, interactive gaming, data storage, data retention, data processing, video conferencing, and voice over Internet Protocol (VoIP). Different MNs 110 in the system may support different applications, may be allowed different levels access to various applications, and may have different resident applications 336 stored in their memory 310. In various embodiments, applications 336 are updated and/or downloaded into MN 110 on an ongoing basis over time, e.g., as new release versions become available and/or as a user accesses and/or subscribes to a new service. In accordance with various embodiments, MN 110 supports the operation of a first application; e.g., application 1 338, over a first wireless link while supporting the simultaneous operation of a second application, e.g., application 2 340, over a second wireless link. Each application uses a different address assigned to the MN or the same address but different application identification information, e.g., an application identifier placed in a packet header.

The memory 310 also includes user/device/session/resource information 334 which may be accessed and used to implement methods and/or data structures. Information 334 includes a plurality of sets of IP address/information (IP address/info 1 140, IP address/info 2 142), each set of information corresponding to a wireless link, and a plurality of sets of application packets (application 1 packets 350, application 2 packets 352). IP address/info 1 140 includes a $1^{st}$ wireless link IP address 342 and optionally $1^{st}$ wireless link ID information 344. IP address/info 2 144 includes a $2^{nd}$ wireless link IP address 346 and optionally $2^{nd}$ wireless link ID information 348. In some embodiments, the $1^{st}$ wireless link IP address information is distinct from the $2^{nd}$ wireless link IP address information 346 so that application packets 1 350 are associated with the application 1 routing using $1^{st}$ wireless link and application 2 packets 352 are associated with application 2 routing using $2^{nd}$ wireless link. In such an embodiment, MN 110 may have been assigned multiple IP addresses. In other embodiments, the $1^{st}$ wireless link IP address 342 and $2^{nd}$ wireless link IP address 346 assigned to MN 110 may be the same and additional identification information 344, 348 is included to distinguish the routing and wireless link used for application 1 packets 350 from the routing and wireless link used for application 2 packets 352.

Application 1 packets 350 may correspond to application 1 packets 128 in BS 106 of FIG. 1, while application 2 packets 352 may correspond to application 2 packets 130 in BS 108. Application 1 routing signaling 124 of FIG. 1 may correspond to signaling using IP address/info 1 140, while application 2 routing signaling 126 of FIG. 1 may correspond to signaling using IP address/info 2 142.

Figure 4:
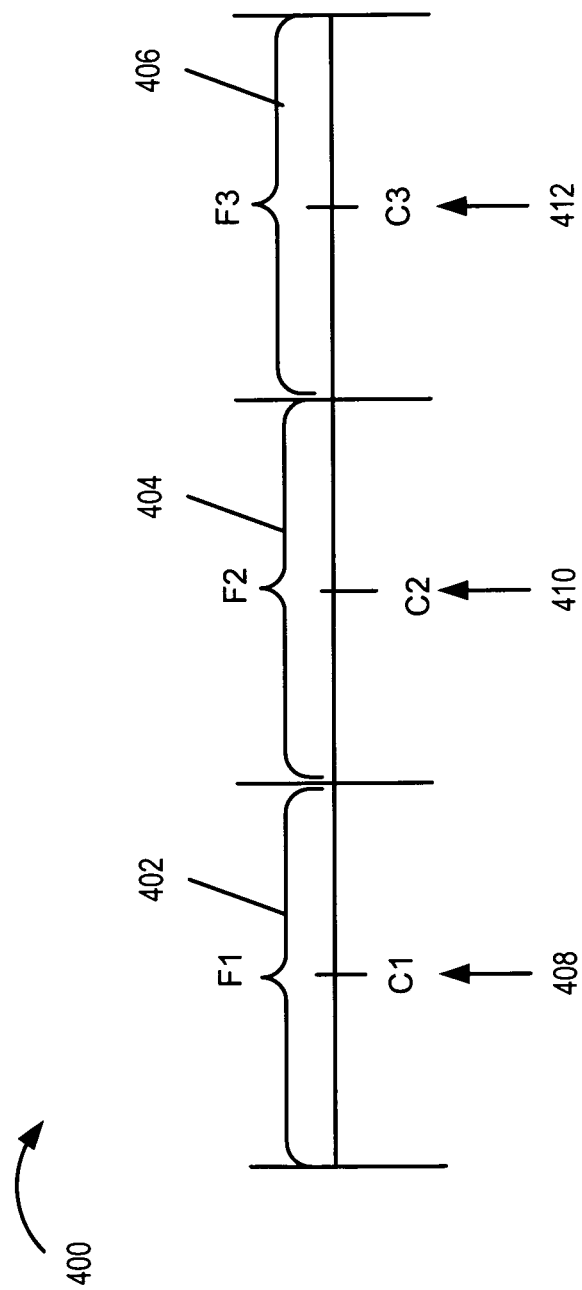
FIG. 4 illustrates three different adjacent frequency bands, F1, F2, F3; each frequency band is centered around a carrier frequency C1, C2, C3, respectively, with each frequency band being divided into a plurality of tones, e.g., uniformly spaced frequencies which are used to communicate symbol information.

In accordance with the various embodiments, different base stations, and/or sectors may use different frequency bands. FIG. 4 drawing 400 illustrates three different adjacent frequency bands, F1 402, F2 404, F3 406. Each frequency band is centered around a carrier frequency C1 408, C2 410, C3 412, respectively, with each frequency band being divided into a plurality of tones, e.g., uniformly spaced frequencies which are used to communicate symbol information. A mobile node can, using a single receiver, pass multiple frequency bands through a tuner, and then perform an FFT to recover the signal corresponding to different tones within one or more frequency subbands. In the case where timing and frequency synchronization exist between transmitters using different frequency bands, e.g., in the case of some base station implementations which include synchronized sectors, the mobile node can easily recover information corresponding to different network points of attachment corresponding to different frequency bands using a single tx/rx (transmit/receive) processing chain in the MN.

In accordance with one feature of various embodiments, a mobile node maintains multiple wireless communications links with different network points of attachment, where a network point of attachment may correspond to, e.g., the particular module, used to support communication using a particular carrier frequency at a particular location. Packets corresponding to different carrier frequencies are routed in many cases through different modules, e.g., filters or other circuitry, which can serve as a separate attachment point from the modules corresponding to another carrier frequency located in the same BS or sector. Thus, a single sector or cell supporting multiple carriers may provide a mobile with multiple independent communications links using different carriers, with each link corresponding to a different frequency band corresponding to a different point of network attachment. However, the mobile can also have multiple communications links with different network points of attachment which are located in different sectors or cells. One such case is shown in FIG. 5.

Figure 5:
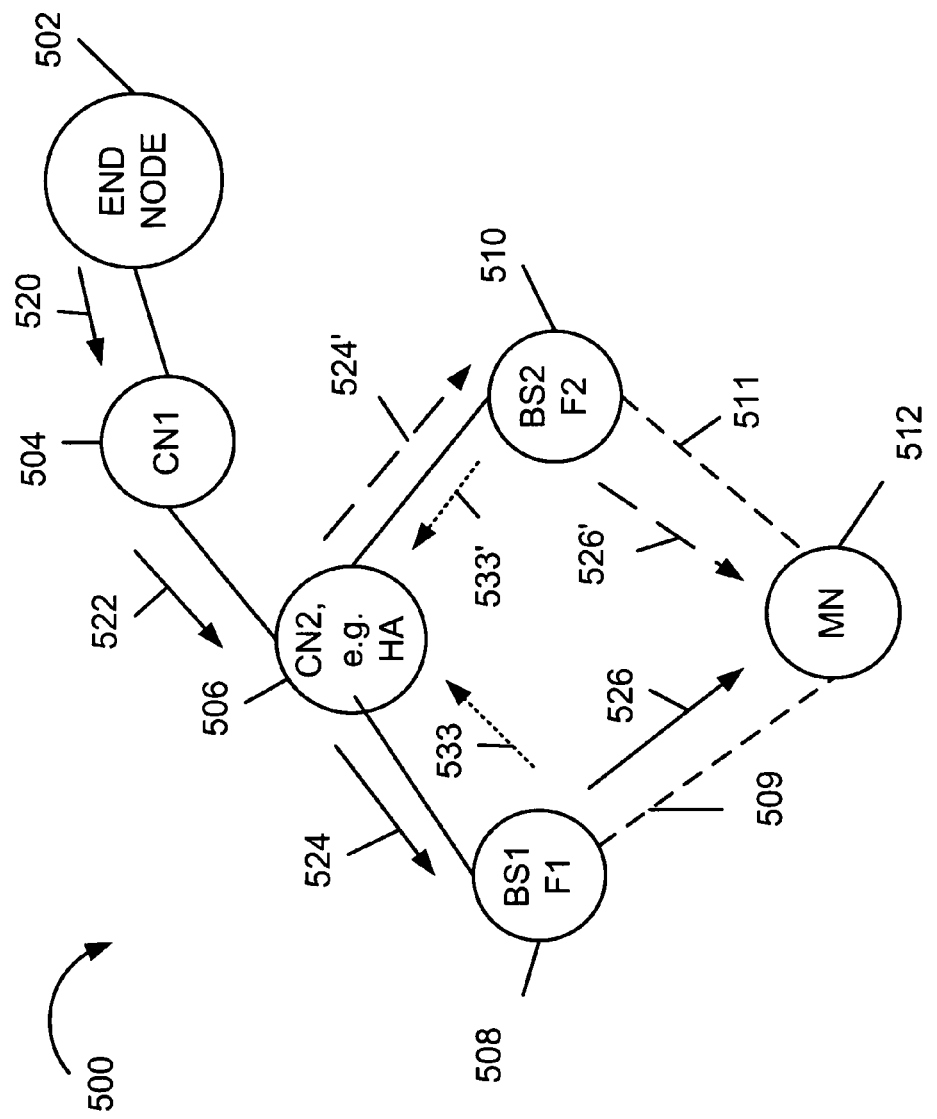
FIG. 5 illustrates an example where a mobile can also have multiple communications links with different network points of attachment which are located in different sectors or cells.

The exemplary system 500 of FIG. 5 includes an end node 502 which may be, e.g., a mobile node or server running an application which directs packets to mobile node 512. The end node 502 and mobile node 512 are coupled together by a communications network which includes a first core node (CN1) 504 which may be, e.g., a router, a second core node CN2 506, which may be, e.g., a Mobile IP Home Agent, and first and second base stations 508, 510. The first and second base stations 508, 510 operate on different, e.g., adjacent frequency bands F1, F2, respectively. End node 502 directs IP packets 520 intended to MN 512 to a home address of the mobile node 512. Router 504 forwards the packets to HA node 506 which is responsible for forwarding the packets to the MN to which they are intended as indicated by the use of the MN's HoA (Home Address) as the destination address in the packet sent by end node 502. The packets 522 intended for MN 512 are communicated from CN1 504 to the HA 506. In accordance with various embodiments, HA includes multiple addresses associated with MN 512 which can be used to forward packets to the MN 512. The HA 506 determines which forwarding address (e.g., which one of multiple Care-of Addresses (CoAs) corresponding to MN 512) to use, depending on which communications wireless communications link 509, 511 has the better quality and/or higher bandwidth at a particular point in time. Given that these links are wireless, and subject to signal interference and other channel condition changes that can vary over time, the base stations 508, 510 send link quality information (533, 533'), respectively to the HA 506 from time to time, e.g., at periodic intervals or when a change in link status is detected. In some embodiments, based on the received link information, the HA selects between which of the two available addresses should be used to forward packets to the MN at any given point in time. Thus, packets coming from the same source and/or application may be directed to different base stations, sectors and/or network attachment points corresponding to different frequency bands for delivery to the MN 512. In other embodiments, as discuss previously, different applications may use different addresses resulting in different routing and the use of the different wireless links 509, 511 for the delivery of packets corresponding to different applications to the MN 512. As link conditions change, HA 506 may switch back and forth between which addresses, and thus which links, are used to forward packets at any given point in time to the MN. In accordance with the embodiment where the HA 506 switches between concurrently existing links used to deliver packets to the MN 512, there is no need to send multiple copies of the same packet over the different links or to duplicate packets and send the same packets to multiple different network attachment points, e.g., base stations for delivery. Packets 524 represent packets which are directed to a MN address, e.g., a first Care-of Address, corresponding to link 509 while packets 524' represent packets which are directed to another MN address, e.g., a second Care-of Address, corresponding to link 511. Packets 526 are packets sent from BS 1 508 to MN 512, while packets 526' are packets sent from BS 2 510 to MN 512.

While described in an exemplary context where the core node 506, which is responsible for directing packets towards link 509 or 511, is a Home Agent node, other embodiments are possible and core node 506 may be implemented as a router or other device.

Figure 6:
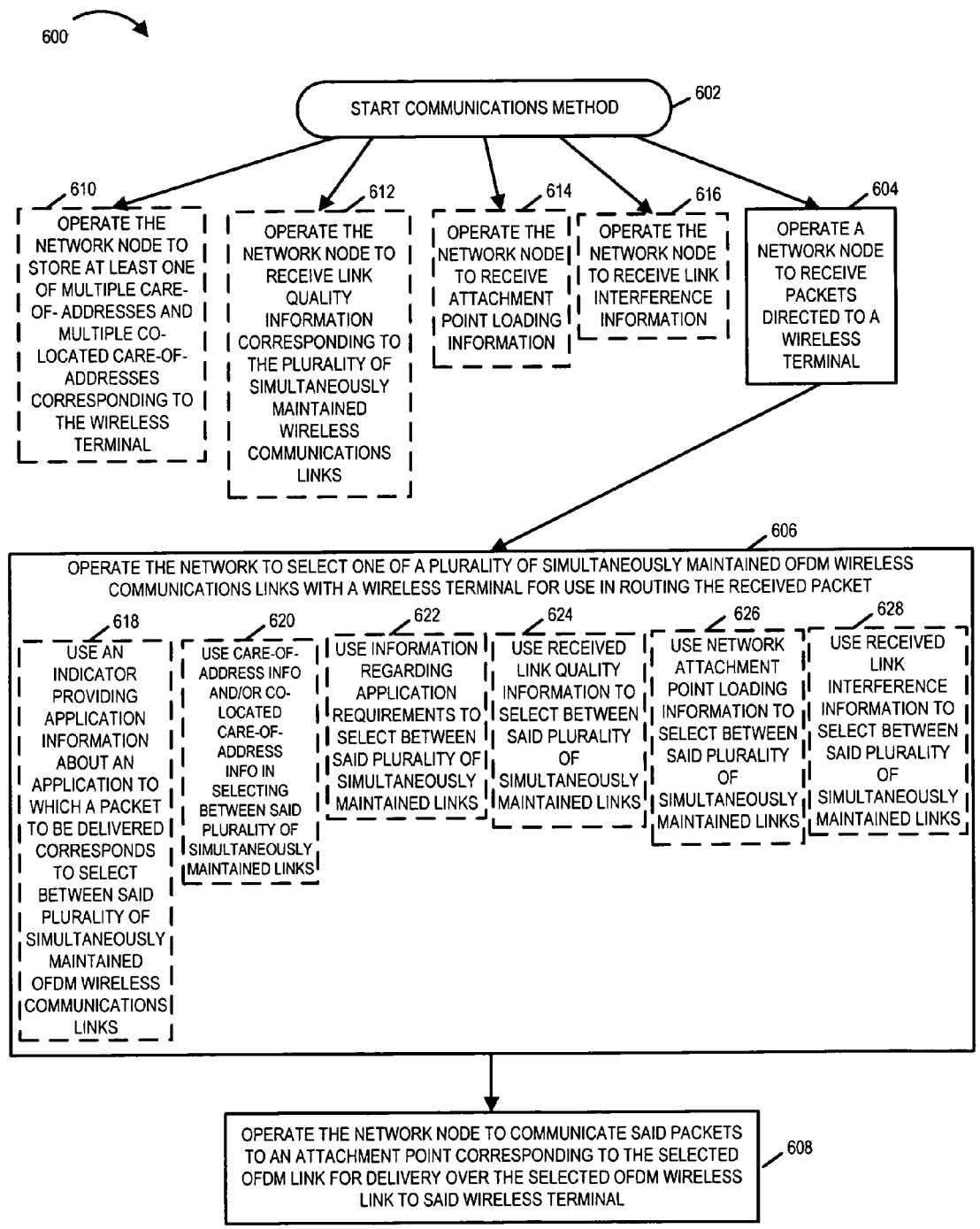
FIG. 6 is a flowchart of an exemplary communications method.

FIG. 6 is a drawing of a flowchart 600 of an exemplary communications method in accordance with various embodiments. Operation starts in step 602, where an exemplary network node, e.g., a home agent node, is powered on and initialized. Operation proceeds from step 602 to step 604. In various embodiments, operation also proceeds from step 602 to one or more of step 610, 612, 614 and 616. In step 610, the network node stores at least one of multiple care-of addresses (CoAs) and multiple co-located care-of addresses (CCoAs) corresponding to the wireless terminal. In step 612, the network node receives link quality information corresponding to a plurality of simultaneously maintained wireless communications links. In step 614, the network node receives attachment point loading information. In step 616, the network node receives link interference information.

In step 604, the network node is operated to receive packets directed to a wireless terminal. Operation proceeds from step 604 to step 606. In step 606, the network node is operated to select one of a plurality of simultaneously maintained OFDM wireless communications links with the wireless terminal for use in routing the received packet. In various embodiments, step 606 includes one or more of sub-steps 618, 620, 622, 624, 626, and 628. In sub-step 618, the network node uses an indicator providing application information about an application to which a packet to be delivered corresponds to select between said plurality of simultaneously maintained OFDM wireless communications links. In sub-step 620, the network node uses care-of address information and/or co-located care-of address information in selecting between said plurality of simultaneously maintained OFDM wireless communications links. In sub-step 622, the network node uses information regarding application requirements in selecting between said plurality of simultaneously maintained OFDM wireless communications links. In sub-step 624, the network node uses received link quality information in selecting between said plurality of simultaneously maintained OFDM wireless communications links. In step sub-626, the network node uses information regarding network attachment point loading information in selecting between said plurality of simultaneously maintained OFDM wireless communications links. In step sub-628, the network node uses received link interference information in selecting between said plurality of simultaneously maintained OFDM wireless communications links. Operation proceeds from step 606 to step 608. In step 608, the network node is operated to communicate said packets to an attachment point corresponding to the selected OFDM wireless link for delivery over the selected OFDM wireless link to said wireless terminal.

In various embodiments, at least one of the simultaneously maintained OFDM wireless communications links is a bi-directional link. In some embodiments at least two of the simultaneously maintained OFDM wireless communications links are bi-directional links. In some embodiments at least one of the simultaneously maintained OFDM wireless communications links is a bi-directional communications link and at least one of the simultaneously maintained OFDM wireless communications links is a uni-directional wireless communications link, e.g., a downlink broadcast link.

In some embodiments, the plurality of simultaneously maintained OFDM communications links includes a first OFDM communications link corresponding to a first carrier frequency and a second OFDM communications link corresponding to a second carrier frequency, both said first and second carrier frequencies being within a frequency band which can be received and processed by said wireless terminal thereby allowing said wireless terminal to receiver both carrier frequencies using a single receiver at the same time.

In various embodiments, the application information indicates the type of information. In some such embodiments, a type of application corresponds to one of: a voice application, a data application, and a broadcast application. In some embodiments, information regarding application requirements includes at least one of: packet delivery latency, bandwidth requirements, data rates, and amount of data.

In various embodiments, wherein the network node is a home agent node, step 610 is performed. In some such embodiments, different care-of addresses and/or different co-located care-of addresses correspond to different ones of said plurality of links.

Figure 7:
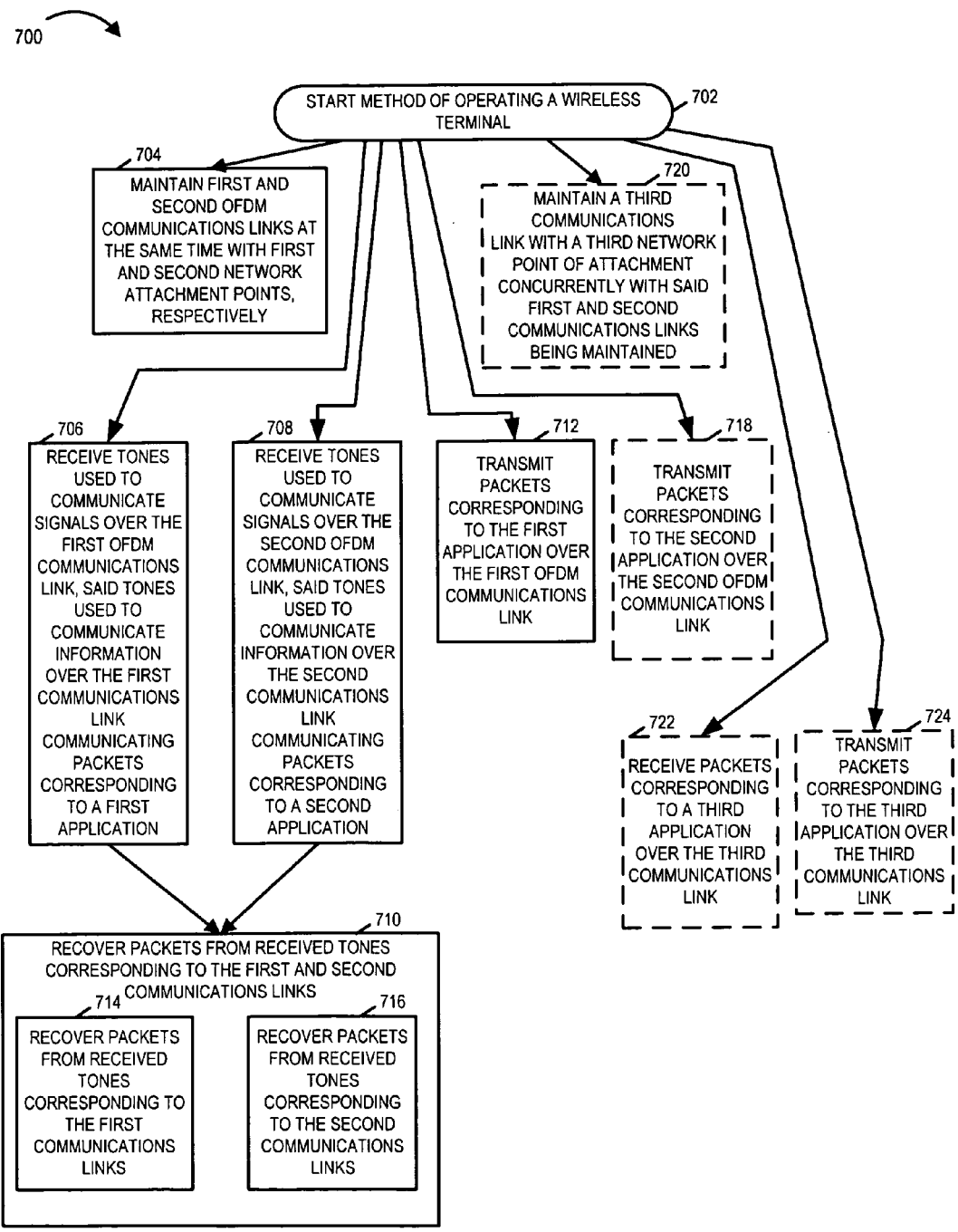
FIG. 7 is a flowchart of an exemplary method of operating a wireless terminal.

FIG. 7 is a flowchart 700 of an exemplary method of operating a wireless terminal. Operation of the exemplary method starts in step 702, where the wireless terminal is powered on and initialized. Operation proceeds from start step 702 to step 704, 706, 708, and 712. In some embodiments, operation also proceeds from start step 702 to one or more of steps 718, 720, 722 and 724.

In step 704, the wireless terminal maintains first and second OFDM communications links at the same time with first and second network attachment points, respectively. In step 706, the wireless terminal receives tones used to communicate signals over the first OFDM communications link, said tones used to communicate information over the first communications link communicating packets corresponding to a first application. In step 708, the wireless terminal receives tones used to communicate signals over the second OFDM communications link, said tones used to communicate information over the second communications link communicating packets corresponding to a second application. In this exemplary embodiment, the first communications link is a bi-directional communications link, and in step 712 the wireless terminal transmits packets corresponding to the first application over the first OFDM communications link. In some embodiments, e.g., an embodiment wherein the second communications link is a bi-directional communications link, step 718 is performed. In step 718, the wireless terminal transmits packets corresponding to the second application over the second OFDM communications link. In some other embodiments, e.g., where the second communications link is a unidirectional link, e.g., a downlink link used for broadcast such as video and/or audio broadcast, step 718 is not performed.

Operation proceeds from steps 706 and 708 to step 710. In step 710, the wireless terminal recovers packets from received tones corresponding to the first and second communications links. Step 710 includes sub-steps 714 and 716. In sub-step 714, the wireless terminal recovers packets from received tones corresponding to the first communications link. In sub-step 716, the wireless terminal recovers packets from received tones corresponding to the second communications link.

In some embodiments, the wireless terminal performs step 720 and maintains a third communications link with a third network point of attachment concurrently with said first and second communications links being maintained. In such an embodiment, at least one of step 722 and 724 are preformed. In step 722, the wireless terminal receives packets corresponding to a third application over the third communications link. In step 724, the wireless terminal transmits packets corresponding to the third application over the third communications link.

In some embodiments, the first and second OFDM communications links are to two different base stations. In some embodiments, the first and second OFDM links are to the same sector of a base station but use different tone blocks. In some embodiments, the first and second OFDM links are to different sectors of the same base station. In some embodiments, recovering packets corresponding to the first application includes processing received OFDM downlink signals from the first attachment point, recovering packets corresponding to the second application includes processing OFDM downlink signals from the second attachment point.

In various embodiments, the first OFDM communications link is a bi-directional communications link and the second communications link is a bi-directional communications link. For example, in one exemplary embodiment the first application correspond to a bi-directional voice application and the second application corresponds to a bi-directional data application.

In some embodiments, the first OFDM communications link is a bi-directional communications link and the second communications link is a uni-directional communications link. In some such embodiments the first application is one of a bi-direction voice application and a bi-direction data application and the second application is one of a downlink broadcast application, e.g., a digital broadcast video and/or digital broadcast audio application.

In various embodiments including three simultaneous wireless links being maintained by the wireless terminal, the first and third communications links are bi-directional communications links and the second communications link is a uni-directional communications link. In some such embodiments, the first application is a data application, the second application is a downlink video broadcast application, and said third application is a voice application. In other such embodiments, the first application is a data application, the second application is a downlink audio broadcast application, and said third application is a voice application.

In some embodiments including three simultaneous wireless links being maintained by the wireless terminal, each of the three wireless communications links are OFDM communications links. In some embodiments including three simultaneous wireless links being maintained by the wireless terminal, the first and second communications links are OFDM communications links, and the third wireless communications link is a CDMA communications link. In some such embodiments, recovering packets corresponding to the first application includes processing received OFDM downlink signals from the first attachment point, recovering packets corresponding to the second application includes processing OFDM downlink signals from the second attachment point, and receiving packets corresponding to the third application includes processing CDMA downlink signals from a third attachment point.

In some embodiments, maintaining first and second communications links at the same time with first and second network attachment points includes maintaining two different IP addresses, a first IP address associated with the first application and a second IP address associated with the second application. In some embodiments, maintaining a communications link with a network attachment point, which is a bi-directional communications link includes at least some of the following: identifying a network attachment point from a plurality of possible network attachment points, e.g., based on received beacon and/or pilot signal, receiving and storing a base station assigned wireless terminal identifier or identifiers, generating and transmitting uplink control channel reports, e.g., using dedicated control channel segments dedicated exclusively to the wireless terminal, receiving and evaluating assignment signals from the attachment point, tuning a receiver/transmitter pair to correspond to the attachment point frequency, performing closed loop timing adjustments, and performing closed loop power adjustments. In some embodiments, maintaining a communications link with a network attachment point, which is a unidirectional communications link includes at least some of the following: identifying the downlink carrier frequency used, tuning a receiver to receive the downlink carrier corresponding to the attachment point, synchronizing with respect to reference signals, e.g., beacon signals, performing timing adjustments to synchronize such that the received signal can be recovered, e.g., synchronizing and maintaining synchronization to within an OFDM symbol time cyclic prefix.

In some embodiments, the first and second OFDM links are to the same base station but use first and second carrier frequencies, the first and second carrier frequencies being different. In some such embodiments, the steps of receiving tones corresponding to the first communications link and receiving tones corresponding to the second communications link include passing a received signal including carrier frequencies corresponding to the first and second OFDM links through a single analog receiver filter, said received signal including tones corresponding to the first communications link and tones corresponding to the second communications link; and the step of recovering packets from received tones corresponding to the first and second OFDM communications links includes: digitizing the filtered signal produced by the analog receiver filter and processing tones in the digitized signal using a first digital receiver chain to recover the first application packets and processing tones in the digitized signal using a second digital receiver chain to recover second application packets.

Figure 8:
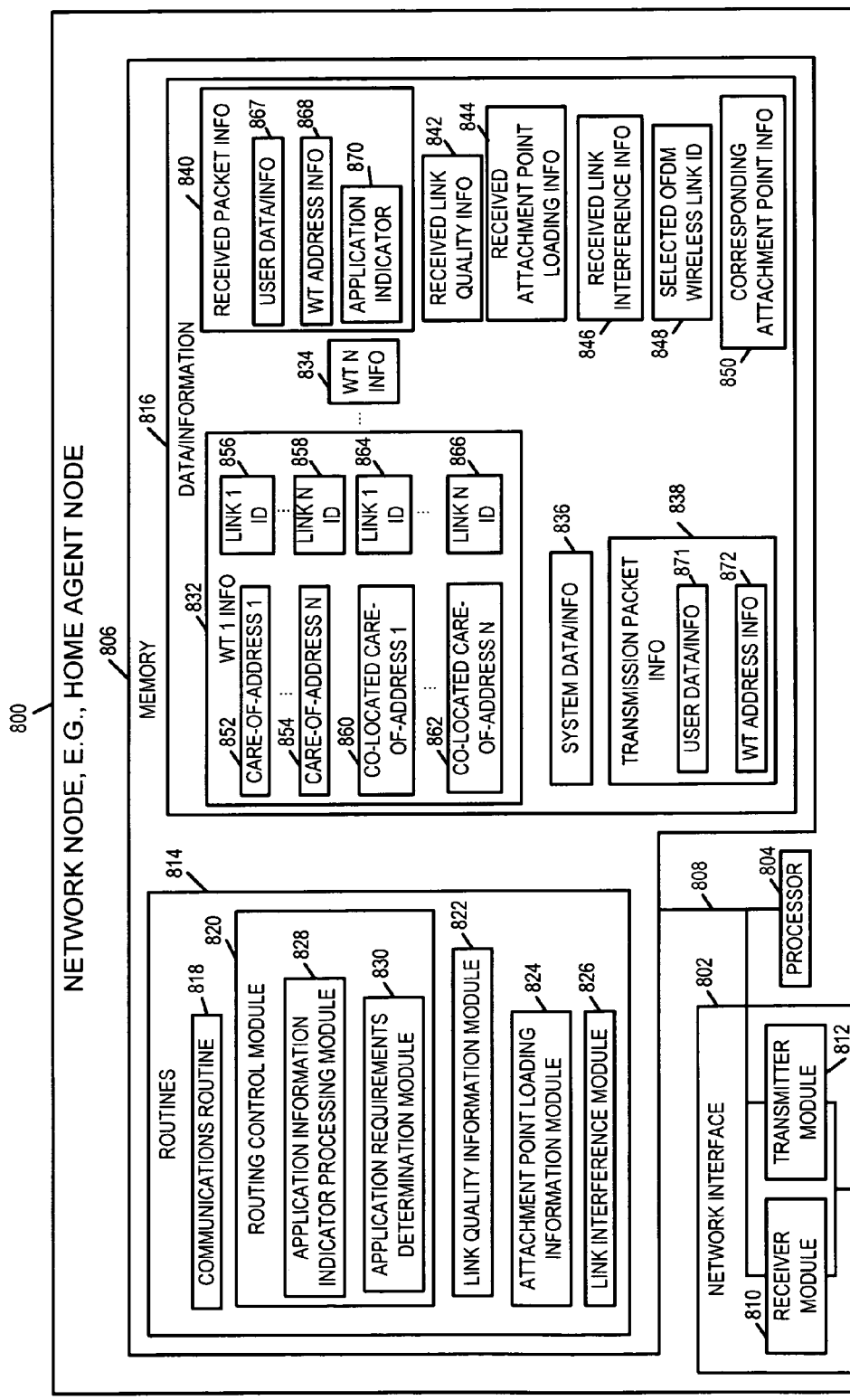
FIG. 8 is a drawing of an exemplary network node.

FIG. 8 is a drawing of an exemplary network node 800, e.g., a home agent node, used in various embodiments. Exemplary network node 800 may be, e.g., exemplary network node 112 of FIG. 1. Exemplary network node 800 includes a network interface 802, a processor 804, and memory 806 coupled together via a bus 808 over which the various elements may interchange data and information.

Network interface 802 couples the network node 800 to other network nodes, e.g., routers, base stations serving as points of attachment for wireless terminals, AAA nodes, application server nodes, etc., and/or the Internet. Network interface 802 includes a receiver module 810 and a transmitter module 812. Receiver module 810 receives packets from other network nodes, a received packet including an address corresponding to a wireless terminal. Transmitter module 812 communicates packets to attachment points, e.g., a packet is communicated to an attachment point corresponding to a selected OFDM link for delivery over the selected OFDM wireless link to a wireless terminal for which the packet is intended.

Memory 806 includes routines 814 and data/information 816. The processor 804, e.g., a CPU, executes the routines 814 and uses the data/information 816 in memory 806 to control the operation of the network node 800 and implement steps of methods. Routines 814 includes a communications routine 818, a routing control module 820, a link quality information module 822, an attachment point loading information module 824, and a link interference module 826. The communications routine 818 implements the various protocols used by the network node 800.

Routing control module 820 is used for selecting one of a plurality of simultaneously maintained OFDM wireless communications links with a wireless terminal for use in routing received packets, e.g., corresponding to an application, to the wireless terminal. Routing control module 820 can perform separate selection operations for different packets or different sets of packets, e.g., corresponding to the same wireless terminal but corresponding to different applications which may be operating simultaneously. Routing control module 820 includes an application information indicator processing module 828 and an application requirements determination module 830. Application information indicator processing module 828 uses an indicator included in a received packet which provides application information about an application to which a packet to be delivered corresponds to be used in selecting between a plurality of simultaneously maintained OFDM wireless communications links. In some embodiments, the application information indicates the type of application. In some such embodiments, the type of application includes one of: a voice application, a data application, and a broadcast application. Application requirements determination module 830 determines application requirements to be taken into consideration when selecting between a plurality of available links to use in routing packets. Information regarding application requirements used by module 830 includes at least one of: packet delivery latency, bandwidth requirements, data rates, and amount of data.

Link quality information module 822 receives link quality information providing information on the quality of at least some of the plurality of simultaneously maintained links. Information from link quality module 822 is available to the routing control module 820 to be used use in selecting between a plurality of simultaneously maintained links.

Attachment point loading information module 824 receives attachment point loading information, which is made available to the routing control module 820. The routing control module 820 selects one of a plurality of simultaneously maintained wireless communications links as a function of network attachment point loading information.

Link interference module 826 receives link interference information, which is made available to the routing control module 820. The routing control module 820 selects one of the plurality of simultaneously maintained wireless communications links as a function of received link interference.

Data/information 816 includes a plurality of sets of wireless terminal information (WT 1 info 832, . . . , WTN info 834). WT 1 information 832 includes multiple care-of addresses (care-of address 1 852, . . . , care-of address N 854) corresponding to WT 1 and multiple co-located care-of addresses (co-located care-of address 1 860, . . . , co-located care-of address N 862) corresponding to WT 1. Different care-of address or different co-located care-of addresses stored in memory 806 corresponding to WT 1, correspond to different ones of a plurality of wireless links. WT 1 information 832 includes (link 1 identification information 856, . . . , link N identification information 858, link 1 identification information 864, . . . , link N identification information 866) corresponding to (care-of address 1 852, . . . , care-of address N 854, co-located care-of address 1 860, . . . , co-located care-of address N 862), respectively.

Data/information 816 also includes received packet information 840, received link quality information 842, received attachment point loading information 844, received link interference information 846, selected OFDM wireless link identification information 848, corresponding attachment point information 850, transmission packet information 838, and system data/information 836. Received packet information 840 includes user data 867, wireless terminal address information 868, and an application indicator 870. Received link quality information 842 includes, e.g., received signal-to-noise ratio report information. Received attachment point loading information 844 includes, e.g., numbers of concurrent users corresponding to a base station sector attachment point and air link resource loading information corresponding to sectors and/or carriers of a base stations. Received link interference information 846 includes, e.g., measured and/or estimated interference information such as information derived from beacon ratio reports. Selected OFDM wireless link identification information 848 includes information identifying a selection performed by routing control module 820. Corresponding attachment point information 850 includes information associated with the attachment point corresponding to the selected OFDM wireless link ID 848, e.g., addressing information. Transmission packet information 838 includes information to be included in a packet to be transmitted to an attachment point such that the user data can be transmitted from the attachment point to the intended wireless terminal over the selected wireless link. Transmission packet information 838 includes user data/info 871 and wireless terminal address information 872.

System data/information 836 includes information corresponding to the various base station attachment points in the system. System information 836 includes base station cell, sector, and/or carrier information. System data/information 836 also includes data/information corresponding to various application sources, e.g., various application server nodes.

In various embodiments at least one of simultaneously maintained OFDM wireless links corresponding to a wireless terminal is a bidirectional link. In some embodiments during some times, a plurality of simultaneously maintained OFDM wireless communications links corresponding to a wireless terminal includes a first OFDM communications link corresponding to a first carrier frequency and a second OFDM communications link corresponding to a second carrier, both said first and second carriers being within a frequency band which can be received and processed by the wireless terminal thereby allowing the wireless terminal to receive both carrier frequencies using a single receiver at the same time. For example, the frequency band may be the composite of F1, F2 and F3 of FIG. 4, and the first and second carriers may be two of C1, C2 and C3 of FIG. 4.

Figure 9:
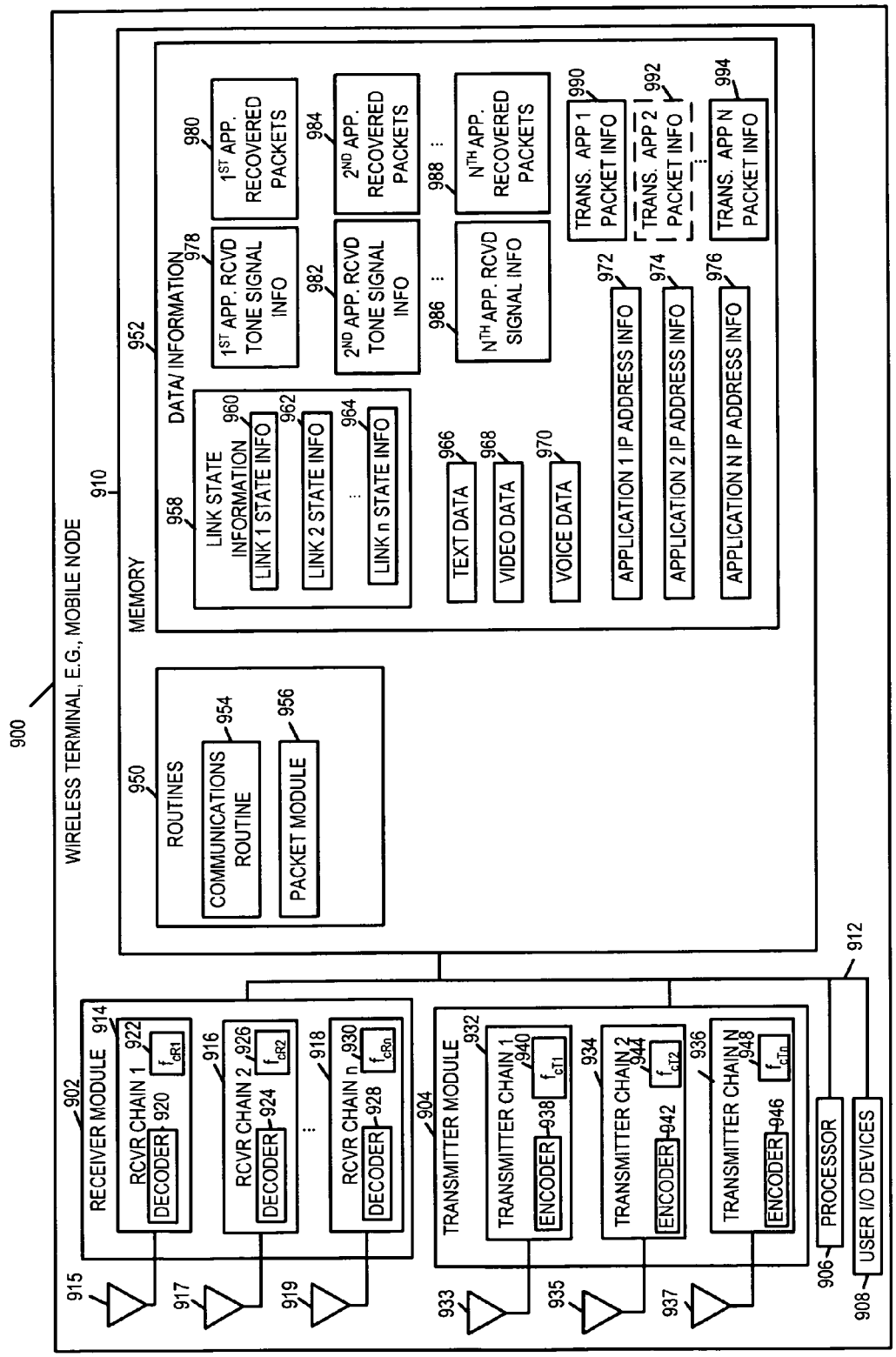
FIG. 9 is a drawing of an exemplary wireless terminal.

FIG. 9 is a drawing of an exemplary wireless terminal 900, e.g., mobile node, used in various embodiments. Exemplary wireless terminal 900 may be, e.g., the exemplary MN 110 of FIG. 1. Exemplary wireless terminal 900 includes a receiver module 902, a transmitter module 904, a processor 906, user I/O devices 908 and a memory 910 coupled together via a bus 912 over which the various elements can interchange data and information. Memory 910 includes routines 950 and data/information 952. The processor 906, e.g., a CPU, executes the routines 950 and uses the data/information 952 in memory 910 to control the operation of the wireless terminal 900 and implement methods. User I/O devices 908 include, e.g., microphone, keyboard, keypad, camera, switches, speaker and/or display. User I/O devices 908 allow a user of wireless terminal 900 to input data/information, access output data/information, and control at least some operations of wireless terminal 900, e.g., initiate a communications sessions, select a downlink broadcast program, etc.

Receiver module 902 includes a plurality of receiver chain modules (receiver chain 1 914, receiver chain 2 916, ..., receiver chain n 918). Receiver chain 1 914 includes a decoder module 920, and receiver chain 1 914 is tuned to downlink carrier frequency ($f_{cR1}$) 922. Receiver chain 2 916 includes a decoder module 924, and receiver chain 2 916 is tuned to downlink carrier frequency ($f_{cR2}$) 926. Receiver chain n 918 includes a decoder module 928, and receiver chain n 918 is tuned to downlink carrier frequency ($f_{cRn}$) 930. Receiver chain 1 914 is coupled to receive antenna 915 via which the wireless terminal receives downlink signals, e.g., including tones conveying packets corresponding to a first application, over a first wireless communications link. Receiver chain 2 916 is coupled to receive antenna 917 via which the wireless terminal receives downlink signals, e.g., including tones conveying packets corresponding to a second application, over a second wireless communications link. Receiver chain n 918 is coupled to receive antenna 919 via which the wireless terminal receives downlink signals, e.g., including signals conveying packets corresponding to an $n^{th}$ application, over an nth. wireless communications link. In various embodiments, at least two of the receiver chains, e.g., receiver chain 1 914 and receiver chain 2 916 are OFDM receiver chains. In such an embodiment, the receiver module 902 can, and sometimes does, simultaneously receive tones used to communicate signals over a first OFDM wireless communications link and tones used to communicate signals over a second OFDM wireless communications link, said tones used to communicate signals over the first OFDM communications link communicating packets corresponding to a first application, said tones used to communicate signals over the second communications link communicating packets corresponding to a' second application. In some embodiments, the same antenna is used for multiple receiver chains.

Figure 10:
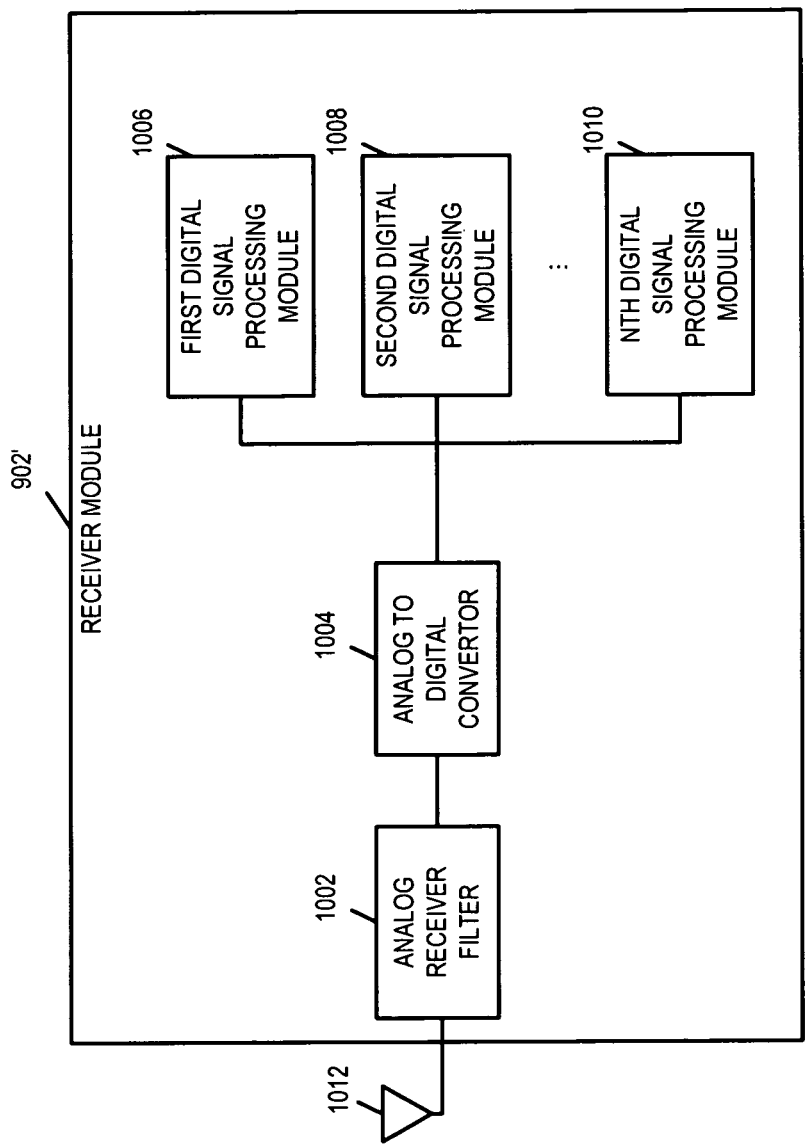
FIG. 10 is a drawing of an exemplary receiver module that may be used in the wireless terminal of FIG. 9.

FIG. 10 is a drawing of an alternative exemplary receiver module 902' that is used in various embodiments of wireless terminal 900 in place of receiver module 902. Exemplary receiver module 902' includes an analog receiver filter 1002, an analog to digital converter 1004, and a plurality of digital signal processing modules (first digital signal processing module 1006, second digital signal processing module 1008, ..., nth digital signal processing module 1010). The analog receiver filter 1002 is coupled to receive antenna 1012 via which the wireless terminal receives downlink signals. In some such exemplary embodiments, wherein first and second wireless communications links are between wireless terminal 900 and the same base station but using first and second carrier frequencies, said first and second carrier frequencies being different, the single analog receiver filter 1002 passes tones corresponding to the first and second communications links, the analog to digital converter 1004 digitizes the filtered signal produced by the analog receiver filter, the first digital signal processing module 1006 processes tones in the digitized signal corresponding to the first communications link using a first digital receiver chain to recover first application packets, and the second digital signal processing module 1008 processes tones in the digitized signal corresponding to the second communications link to recover second application packets. Nth digital signal processing module 1010 is used to recover packets corresponding to another application, e.g., a third application, communicated over the nth communications link.

Returning to FIG. 9, transmitter module 904 includes a plurality of transmitter chain modules (transmitter chain 1 module 932, transmitter chain 2 module 934, ..., transmitter chain N module 936). Transmitter chain 1 932 includes an encoder module 938, and transmitter chain 1 932 is tuned to uplink carrier frequency ($f_{cT1}$) 940. Transmitter chain 2 934 includes an encoder module 942, and transmitter chain 2 934 is tuned to uplink carrier frequency ($f_{cT2}$) 944. Transmitter chain N 936 includes a encoder module 946, and transmitter chain N 936 is tuned to uplink carrier frequency ($f_{cTn}$) 948. Transmitter chain 1 932 is coupled to transmit antenna 933 via which the wireless terminal transmits uplink signals, e.g., including tones conveying packets corresponding to a first application, over a first wireless communications link. Transmitter chain 2 934 is coupled to transmit antenna 935 via which the wireless terminal transmits uplink signals, e.g., including tones conveying packets corresponding to a second application, over a second wireless communications link. Transmitter chain N 936 is coupled to transmit antenna 937 via which the wireless terminal transmits uplink signals, e.g., including signals conveying packets corresponding to an $n^{th}$ application, over an nth. wireless communications link. In various embodiments, the same antenna is used for multiple transmitter chains. In some embodiments the same antenna is used for the receiver module 902 and transmitter module 904.

Routines 950 include a communications routine 954 and a packet module 956. Communications routine 954 implements various communications protocols used by the base station and performs various control operations regarding control of receiver module 902, transmitter module 904 and user I/O interfaces 908. Packet module 956 recovers packets from received tones and/or signals corresponding to the communications links being maintained by the wireless terminal 900. For example, consider that first and second OFDM wireless communications links are being maintained by wireless terminal 900, packet module 956 recovers packets corresponding to first and second applications from received tones corresponding to first and second OFDM wireless communications links respectively.

Data/information 952 includes link state information 958 corresponding to the one or more links being maintained by the wireless terminal. Link state information 958 includes (link 1 state information 960, link 2 state information 962, ..., link n state information 964). Link state information is used by wireless terminal 900 for maintaining multiple wireless links at the same time with different network points of attachment, e.g., a first OFDM communications link with a first base station point of network attachment and a second OFDM communications link with a second base station point of network attachment. For example, the first and second OFDM link can be to two different base stations. Alternatively, the first and second OFDM links can be to the same sector of a base station but use different tone blocks. Alternatively, the first and second OFDM links can be to different sectors of the same base station. Link state information, e.g. link state 1 information 960, includes information associated with the link, e.g., wireless terminal identifier information, attachment point identifier information, downlink carrier information, downlink tone block information, uplink carrier information, uplink tone block information, addressing/routing information, session information, link quality information, link interference information, beacon/pilot information, tone information, tone hopping information, etc.

Data/information 952 includes text data 966, video data 968, and voice data 970. For example text data 966 may be data being communicated between WT 900 and a peer node in a data communications session over a first OFDM wireless communications link which is bi-directional; video data 966 may include data received over a second OFDM wireless communications link which is uni-directional, e.g., downlink video broadcast information; voice data 970 may include information being communicated over a third bi-directional wireless communications link, e.g., an OFDM or CDMA link, which is supporting a voice communications session, e.g., a voice over IP communications session.

Data/information 952 includes different IP addresses corresponding to different applications (application 1 IP address information 972, application 2 IP address information 974, ... application N IP address information 976) associated with (first wireless link, second wireless link, ..., nth wireless link), respectively.

Data/information 952 includes $1^{st}$ application received tone signal information 978 and corresponding $1^{st}$ application recovered packets 980, $2^{nd}$ application received tone signal information 982 and corresponding $2^{nd}$ application recovered packets 984, and Nth application received signal information 986 and corresponding Nth application recovered packets 988. Data/information 952 also includes transmission application 1 packet information 990, transmission application 2 packet information 992, and transmission application N packet information 994. Note that transmission application 2 packet information 992 is indicated with dotted lines to indicate that in various embodiments, one or more OFDM wireless links being maintained simultaneously is a broadcast downlink link, in which case there are not corresponding uplink packets to be transmitted.

Figure 11:
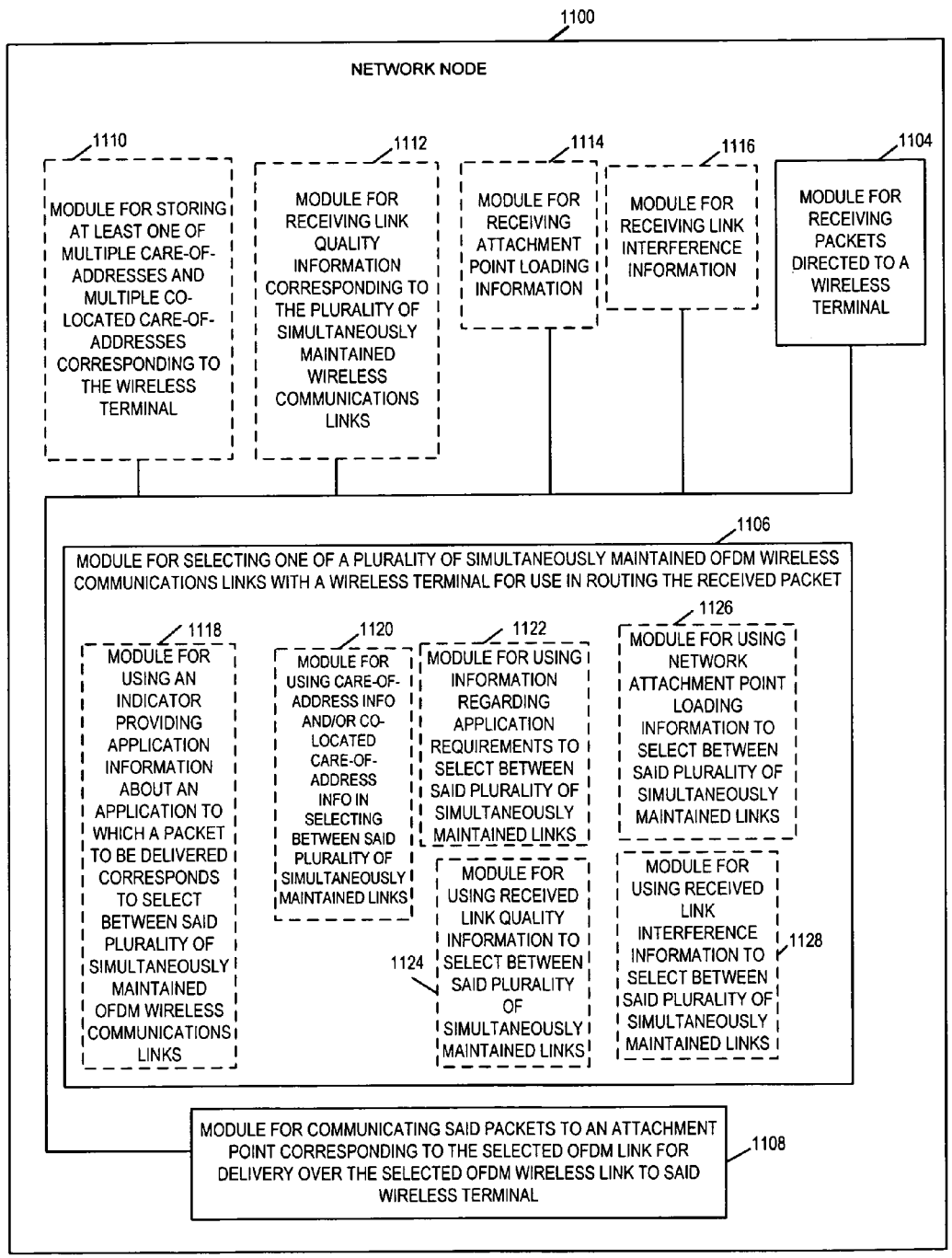
FIG. 11 is a drawing of an exemplary network node, e.g., home agent node, that may implement methods of FIG. 6.

FIG. 11 is a drawing of an exemplary network node 1100 in accordance with various embodiments. Exemplary network node 1100 may be used to implement the exemplary method of flowchart 600 of FIG. 6. Exemplary network node 1100 may be, e.g., network node 112 of FIG. 1. Exemplary network node 1100 includes a module for receiving packets directed to a wireless terminal 1104, a module for selecting one of a plurality of simultaneously maintained OFDM wireless communications links with a wireless terminal for use in routing the received packet 1106 and a module for communicating said packets to an attachment point corresponding to the selected OFDM link for delivery over the selected OFDM wireless link to said wireless terminal 1108. In various embodiments, network node 1100 includes one or more of: a module for storing at least one of multiple care-of addresses and/or multiple co-located care-of addresses corresponding to the wireless terminal 1110, a module for receiving link quality information corresponding to the plurality of simultaneously maintained wireless communications links 1112, a module for receiving attachment point loading information 1114, a module for receiving link interference information 1116. In various embodiments the module for selecting one of a plurality of simultaneously maintained OFDM wireless communications links with a wireless terminal for use in routing the received packet 1106 includes one or more of: a module for using an indicator providing application information about an application to which a packet to be delivered corresponds to select between said plurality of simultaneously maintained OFDM wireless communications links 1118, a module for using care-of address information and/or co-located care-of address information in selecting between said plurality of simultaneously maintained links, a module for using information regarding application requirements to select between said plurality of simultaneously maintained links 1122, a module for using received link quality information to select between said plurality of simultaneously maintained links 1124, a module for using network attachment point loading information to select between said plurality of simultaneously maintained links 1126, and module for using received link interference information to select between said plurality of simultaneously maintained links 1128.

Figure 12:
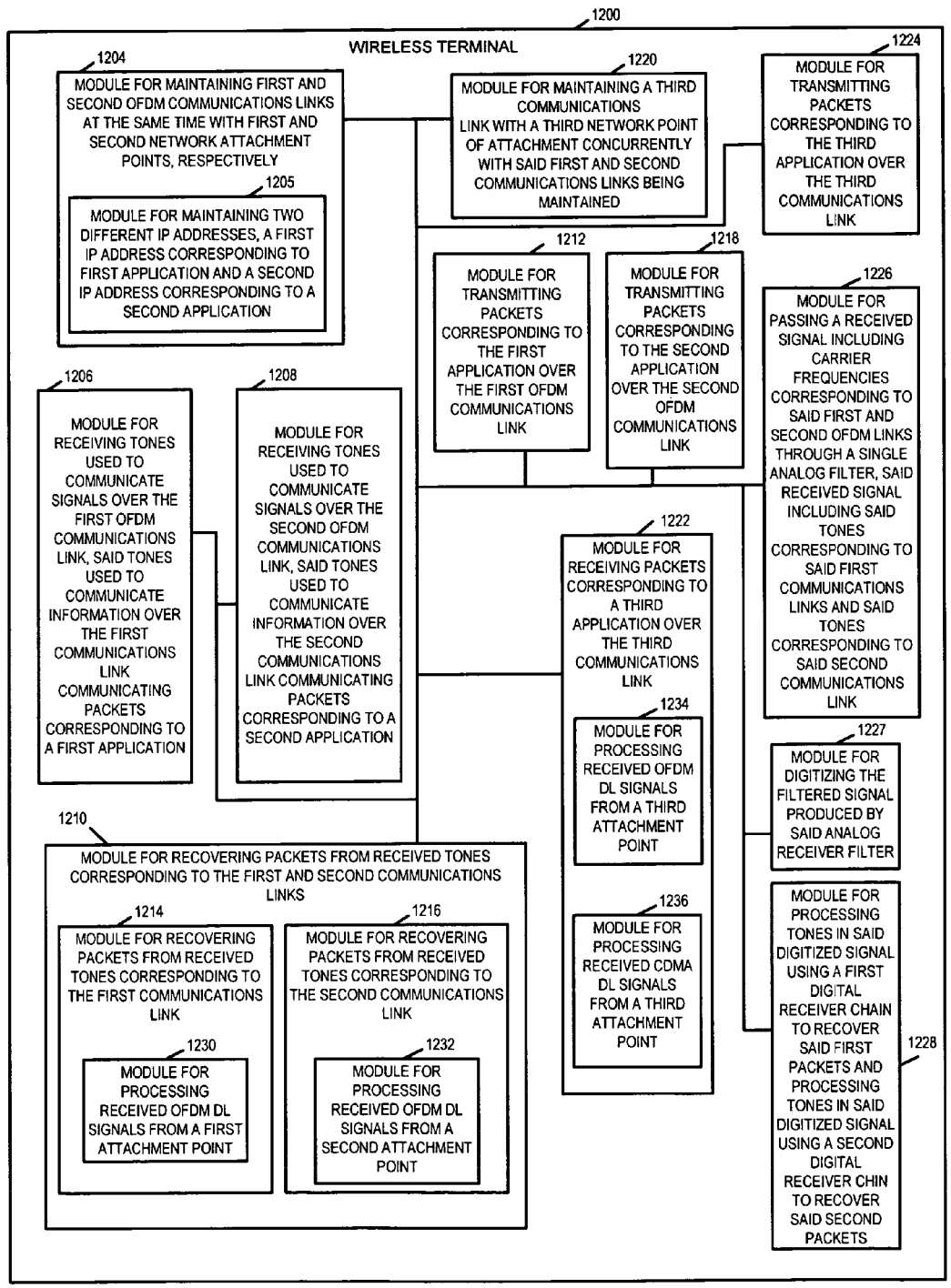
FIG. 12 is a drawing of an exemplary wireless terminal, e.g., mobile node, that may implement methods of FIG. 7.

FIG. 12 is a drawing of an exemplary wireless terminal 1200, e.g., mobile node, in accordance with various embodiments. Exemplary wireless terminal 1200 may be used to implement the exemplary method of flowchart 700 of FIG. 7. Exemplary WT 1200 may be, e.g., MN 110 of FIG. 1. Exemplary wireless terminal 1200 includes various modules for performing various operations (1204, 1205, 1206, 1208, 1210, 1212, 1214, 1216, 1218, 1220, 1222, 1224, 1226, 1227, 1228, 1230, 1230, 1232, 1234, 1236). The wireless terminal 1200 includes a module for maintaining first and second OFDM communications links at the same time with first and second network attachment points, respectively 1204, which includes a module for maintaining two different IP addresses 1205, a first IP address corresponding to a first application and a second IP address corresponding to a second application.

With regard to the downlink of the first and second OFDM communications links, the wireless terminal 1200 includes a module for receiving tones used to communicate signals over the first OFDM communications link 1206, said tones used to communicate information over the first communications link communicating packets corresponding to a first application, a module for receiving tones used to communicate signals over the second OFDM communications link 1208, said tones used to communicate information over the second communications link communicating packets corresponding to a second application, and a module for recovering packets corresponding to the first and second communications links 1210. Module for recovering packets 1210 includes a module for recovering packets from received tones corresponding to the first communications link 1214, which includes a module for processing received OFDM downlink signals from a first attachment point 1230, and a module for recovering packets from received tones corresponding to the second communications link 1216, which includes a module for processing received OFDM downlink signals from a second attachment point 1232. In some embodiments, e.g., an embodiment where the wireless terminal uses a single analog receiver chain to receive downlink signals corresponding to multiple OFDM communications links, the wireless terminal includes a module for passing a received signal including carrier frequencies corresponding to said first and second OFDM links through a single analog filter 1226, said received signal including said tones corresponding to said first communications link and said tones corresponding to said second communications link, a module for digitizing the filtered signal produced by said analog receiver filter 1227, and a module for processing tones in said digitized signal using a first digital receiver chain to recover said first packets and processing tones in said digitized signal using a second digital receiver chain to recover said second packets 1228.

With regard to the uplink of the first and second OFDM communications links, the wireless terminal 1200 includes a module for transmitting packets corresponding to the first application over the first OFDM communications link 1212 and a module for transmitting packets corresponding to the second application over the second OFDM communications link 1218.

The exemplary wireless terminal 1200 also includes a module for maintaining a third communications link with a third network point of attachment concurrently with said first and second communications links being maintained 1220. Wireless terminal 1200 further includes a module for receiving packets corresponding to a third application over the third communications link 1222 and a module for transmitting packets corresponding to the third application over the third communications link 1224. Module for receiving packets corresponding to a third application 1222 includes a module for processing received OFDM downlink signals from a third attachment point 1234 and a module for processing received CDMA downlink signals from a third attachment point 1236.

The techniques of various embodiments may be implemented using software, hardware and/or a combination of software and hardware. Various embodiments are directed to apparatus, e.g., wireless terminals including mobile nodes such as mobile terminals, base stations, communications systems and elements. It is also directed to methods, e.g., method of controlling and/or operating mobile nodes, base stations and/or communications systems, e.g., hosts. Various embodiments are also directed to machine readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

While described in the context of an OFDM system, at least some of the methods and apparatus of various embodiments, are applicable to a wide range of communications systems including many non-OFDM and/or non-cellular systems Numerous additional variations on the methods and apparatus described above will be apparent to those skilled in the art in view of the above description. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A communications, method comprising:
    operating a network node to receive packets directed to a wireless terminal;
    operating the network node to select one of a plurality of simultaneously maintained orthogonal frequency division multiplexing (OFDM) wireless communications links with the wireless terminal for use in routing the received packets for delivery to an application on the wireless terminal, said application being one of a plurality of different applications on said wireless terminal, different ones of said simultaneously maintained wireless communications links corresponding to different applications, operating the network node to select one of the plurality of the simultaneously maintained orthogonal frequency division multiplexing wireless communications links including selecting said one of the plurality of simultaneously maintained orthogonal frequency division multiplexing wireless communications links, based on an address assigned to the wireless terminal and used by the application to which the packets are to be delivered, when said wireless terminal is assigned multiple addresses and uses different ones of said multiple addresses for different applications; and
    operating said network node to communicate said packets to an attachment point corresponding to the selected orthogonal frequency division multiplexing link for delivery over the selected orthogonal frequency division multiplexing wireless link to said wireless terminal, said attachment point being coupled to said network node.

2. The communications method of claim 1, wherein operating the network node to select one of the plurality of simultaneously maintained orthogonal frequency division multiplexing wireless communications links includes:
    using an indicator providing application information about an application to which a packet to be delivered corresponds to select between said plurality of simultaneously maintained OFDM wireless communications links.

3. The communications method of claim 2, wherein said plurality of simultaneously maintained OFDM communications links include a first orthogonal frequency division multiplexing communications link corresponding to a first carrier frequency and a second orthogonal frequency division multiplexing communications link corresponding to a second carrier frequency, both said first and second carrier frequencies being within a frequency band which can be received and processed by said wireless terminal thereby allowing the wireless terminal to receive both carrier frequencies using a single receiver at the same time.

4. The communications method of claim 2,
wherein said application information indicates the type of application; and
wherein said indicated type of application is one of: a voice application, a data application, and a broadcast application.

5. The communication method of claim 2, wherein operating the network node to select one of the plurality of simultaneously maintained orthogonal frequency division multiplexing wireless communications links further includes:
using information regarding application requirements to determine which of the plurality of links to use in routing packets.

6. The communications method of claim 5, wherein said information regarding application requirements includes at least one of: packet delivery latency, bandwidth requirements, data rates and amount of data.

7. The communications method of claim 2, wherein said network node is a home agent, the method further comprising:
operating the home agent to store at least one of multiple Care-of Addresses and multiple Co-located Care-of Addresses corresponding to the wireless terminal.

8. The communications method of claim 2, wherein different Care-of Addresses or different Co-located Care-of Addresses corresponding to the wireless terminal correspond to different ones of said plurality of links.

9. The communications method of claim 1, further comprising operating the network node to receive link quality information corresponding to the plurality of simultaneously maintained OFDM wireless communications links; and
wherein operating the network node to select one of the plurality of simultaneously maintained OFDM wireless communications links further includes:
using received link quality information to select between said plurality of simultaneously maintained OFDM wireless communications links.

10. The communications method of claim 9, further comprising operating the network node to receive attachment point loading information; and
wherein operating the network node to select one of the plurality of simultaneously maintained OFDM wireless communications links includes selecting the communications link as a function of network attachment point loading information.

11. The communications method of claim 9, further comprising operating the network node to receive link interference information; and
wherein operating the network node to select one of the plurality of simultaneously maintained OFDM wireless communications links further includes selecting the communications link as a function of the received link interference information.

12. A network node for use in a communications network, comprising:
memory for storing data;
means, implemented in hardware, for receiving packets directed to a wireless terminal;
means, implemented in hardware, for selecting one of a plurality of simultaneously maintained orthogonal frequency division (OFDM) multiplexing wireless communications links with the wireless terminal for use in routing the received packets for delivery to an application on the wireless terminal, said application being one of a plurality of different applications on said wireless terminal, different ones of said simultaneously maintained wireless communications links corresponding to different applications, said means implemented in hardware, for selecting one of the plurality of the simultaneously maintained orthogonal frequency division multiplexing wireless communications links selecting said one of the plurality of simultaneously maintained orthogonal frequency division multiplexing wireless communications links, based on an address assigned to the wireless terminal and used by the application to which the packets are to be delivered, when said wireless terminal is assigned multiple addresses and uses different ones of said multiple addresses for different applications; and
means, implemented in hardware, for communicating said packets to an attachment point corresponding to the selected orthogonal frequency division multiplexing link for delivery over the selected orthogonal frequency division multiplexing wireless link to said wireless terminal, said attachment point being coupled to said network node.

13. The network node of claim 12, wherein said means, implemented in hardware, for selecting one of the plurality of simultaneously maintained orthogonal frequency division multiplexing wireless communications links further includes:
means, implemented in hardware, for using an indicator providing application information about an application to which a packet to be delivered corresponds to select between said plurality of simultaneously maintained orthogonal frequency division multiplexing wireless communications links.

14. The network node of claim 13, wherein said plurality of simultaneously maintained orthogonal frequency division multiplexing communications links include a first orthogonal frequency division multiplexing communications link corresponding to a first carrier frequency and a second orthogonal frequency division multiplexing communications link corresponding to a second carrier frequency, both said first and second carrier frequencies being within a frequency band which can be received and processed by said wireless terminal thereby allowing the wireless terminal to receive both carrier frequencies using a single receiver at the same time.

15. The network node of claim 13,
wherein said application information indicates the type of application; and
wherein said indicated type of application is one of: a voice application, a data application, and a broadcast application.

16. The network node of claim 13, wherein said means, implemented in hardware, for selecting one of the plurality of simultaneously maintained orthogonal frequency division multiplexing wireless communications links further includes:

means, implemented in hardware, for using information regarding application requirements to determine which of the plurality of simultaneously maintained orthogonal frequency division multiplexing wireless communications links to use in routing packets.

17. The network node of claim 16, wherein said information regarding application requirements includes at least one of: packet delivery latency, bandwidth requirements, data rates and amount of data.

18. The network node of claim 13, wherein said network node is a home agent, the network node further comprising:
means, implemented in hardware, for storing at least one of multiple Care-of Addresses and multiple Co-located Care-of Addresses corresponding to the wireless terminal.

19. The network node of claim 13, wherein different Care-of Addresses or different Co-located Care-of Addresses corresponding to the wireless terminal correspond to different ones of said plurality of links.

20. The network node of claim 12, further comprising means, implemented in hardware, for receiving link quality information corresponding to the plurality of simultaneously maintained OFDM wireless communications links; and
wherein said means, implemented in hardware, for selecting one of the plurality of simultaneously maintained wireless communications links further includes:
means, implemented in hardware, for using received link quality information to select between said plurality of simultaneously maintained OFDM wireless communications links.

21. The network node of claim 20, further comprising means, implemented in hardware, for receiving attachment point loading information; and
wherein said means, implemented in hardware, for selecting one of the plurality of simultaneously maintained OFDM wireless communications links further includes means, implemented in hardware, for selecting the communications link as a function of network attachment point loading information.

22. The network node of claim 20, further comprising means, implemented in hardware, for receiving link interference information; and
wherein said means, implemented in hardware, for selecting one of the plurality of simultaneously maintained OFDM wireless communications links includes means, implemented in hardware, for selecting the communications link as a function of the received link interference information.

23. A network node, comprising:
a receiver implemented in hardware, for receiving packets from another network node including an address corresponding to a wireless terminal;
a routing control module for selecting one of a plurality of simultaneously maintained orthogonal frequency division multiplexing (OFDM) wireless communications links with said wireless terminal for use in routing the received packets for deliver to an application on said wireless terminal, said application being one of a plurality of different applications on said wireless terminal, different ones of said simultaneously maintained wireless communications links corresponding to different applications, said routing control module being configured to select said one of the plurality of simultaneously maintained orthogonal frequency division multiplexing wireless communications links, based on an address assigned to the wireless terminal and used by the application to which the packets are to be delivered, when said wireless terminal is assigned multiple addresses and uses different ones of said multiple addresses for different applications; and
a transmitter for communicating said packets to an attachment point corresponding to the selected orthogonal frequency division multiplexing link for delivery over the selected orthogonal frequency division multiplexing wireless link to said wireless terminal, said attachment point being coupled to said network node.

24. The network node of claim 23, wherein said routing control module includes:
an application information indicator processing module for using an indicator included in a received packet which provides application information about an application to which a packet to be delivered corresponds to select between said plurality of simultaneously maintained orthogonal frequency division multiplexing wireless communications links.

25. The network node of claim 24, wherein said plurality of simultaneously maintained orthogonal frequency division multiplexing communications links include a first orthogonal frequency division multiplexing communications link corresponding to a first carrier frequency and a second orthogonal frequency division multiplexing communications link corresponding to a second carrier frequency, both said first and second carrier frequencies being within a frequency band which can be received and processed by said wireless terminal thereby allowing the wireless terminal to receive both carrier frequencies using a single receiver at the same time.

26. The network node of claim 24, wherein said routing control module further includes:
an application requirements determination module for determining application requirements to be taken into consideration when selecting between the plurality of available links to use in routing packets.

27. The network node of claim 24, wherein said network node is a home agent, the network node further comprising:
memory including at least one of multiple Care-of Addresses and multiple Co-located Care-of Addresses corresponding to the wireless terminal.

28. The network node of claim 24, wherein different Care-of Addresses or different Co-located Care-of Addresses stored in said memory corresponding to the wireless terminal correspond to different ones of said plurality of simultaneously maintained OFDM wireless communications links.

29. The network node of claim 23, further comprising:
a link quality information module for receiving link quality information providing information on the quality of at least some of the plurality of simultaneously maintained OFDM wireless communications links; and
wherein said routing control module is further configured to select one of the plurality of simultaneously maintained OFDM wireless communications links by:
using received link quality information to select between said plurality of simultaneously maintained OFDM wireless communications links.

30. A method of operating a wireless terminal, the method comprising:
maintaining first and second orthogonal frequency division multiplexing communications links at the same time with first and second network points of attachment, respectively;
receiving a signal including a first set of tones corresponding to the first orthogonal frequency division multiplexing communications link and a second set of tones corresponding to the second orthogonal frequency division multiplexing communications link, said first set of tones corresponding to a first carrier frequency and communicating packets corresponding to a first application, said second set of tones corresponding to a second carrier frequency and communicating packets corresponding to a second application, said first and second carriers being different;

passing the received signal including said first and second sets of tones corresponding to said first and second carriers through an analog filter to produce a filtered signal; and recovering packets from the filtered signal communicated over said first and second orthogonal frequency division multiplexing communications links by:
operating a first digital receiver chain to recover packets from said first set of tones and
operating a second digital receiver chain to recover packets from said second set of tones, said first and second digital receiver chains being different receiver chains.

31. The method of claim 30,
wherein said first and second orthogonal frequency division multiplexing links are to two different base stations; and
wherein at least one of said first and second orthogonal frequency division multiplexing links is a bi-directional communications link, the communications method further comprising:
transmitting at least some packets over said bi-directional communications link.

32. The method of claim 30,
wherein recovering packets from the filtered signal further includes:
digitizing the filtered signal produced by said analog receiver filter.

33. The method of claim 30, wherein said first and second orthogonal frequency division multiplexing links use different tone blocks.

34. The method of claim 30, wherein said first and second orthogonal frequency division multiplexing links are to different sectors of the same base station.

35. The method of claim 30, wherein said first orthogonal frequency division multiplexing communications link is a bi-directional communications link and said second orthogonal frequency division multiplexing communications link is a uni-directional communications link.

36. The method of claim 30, further comprising:
maintaining a third communications link with a third network point of attachment concurrently with said first and second communications links being maintained; and
receiving packets corresponding to a third application over the third communications link.

37. The method of claim 36, wherein said first and third communication links are bi-directional communications links and said second communications link is a uni-directional communications link.

38. The method of claim 37, further comprising:
transmitting packets corresponding to the first application over the first orthogonal frequency division multiplexing communications link; and
transmitting packets corresponding to the third application over the third communications link.

39. The method of claim 38, wherein said first application is a data application, said second application is a downlink video broadcast application, and said third application is a voice application.

40. The method of claim 38, wherein recovering packets corresponding to said first application includes processing received orthogonal frequency division multiplexing downlink signals from the first attachment point; and wherein recovering packets corresponding to the second application includes processing orthogonal frequency division multiplexing downlink signals from the second attachment point; and wherein receiving packets corresponding to the third application includes processing CDMA downlink signals from a third attachment point.

41. The method of claim 30, wherein maintaining first and second communications links at the same time with first and second network points of attachment includes maintaining two different IP addresses, a first IP address associated with the first application and a second IP address associated with the second application.

42. A wireless terminal, comprising:
means, implemented in hardware, for maintaining first and second orthogonal frequency division multiplexing communications links at the same time with first and second network points of attachment, respectively;
means, implemented in hardware, for receiving a signal including a first set of tones corresponding to the first orthogonal frequency division multiplexing communications link and a second set of tones corresponding to the second orthogonal frequency division multiplexing communications link, said first set of tones corresponding to a first carrier frequency and communicating packets corresponding to a first application, said second set of tones corresponding to a second carrier frequency and communicating packets corresponding to a second application, said first and second carriers being different;
means, implemented in hardware, for passing the received signal including said first and second sets of tones corresponding to said first and second carriers through an analog filter to produce a filtered signal, and
means, implemented in hardware, for recovering packets from the filtered signal communicated over said first and second OFDM communications links by:
operating a first digital receiver chain to recover packets from said first set of tones and
operating a second digital receiver chain to recover packets from said second set of tones, said first and second digital receiver chains being different.

43. The wireless terminal of claim 42, wherein at least one of said first and second orthogonal frequency division multiplexing links is a bi-directional communications link, the wireless terminal further comprising:
means, implemented in hardware, for transmitting at least some packets over said bi-directional communications link.

44. The wireless terminal of claim 42, wherein said means, implemented in hardware, for recovering packets from the filtered signal includes:
means, implemented in hardware, for digitizing the filters signal produced by said analog filter.

45. The wireless terminal of claim 42, wherein said first and second OFDM links use different tone blocks.

46. The wireless terminal of claim 42, wherein said first and second OFDM links are to different sectors of the same base station.

47. The wireless terminal of claim 42, wherein said first orthogonal frequency division multiplexing communications link is a bi-directional communications link and said second orthogonal frequency division multiplexing communications link is a uni-directional communications link.

48. The wireless terminal of claim 42, further comprising:
means, implemented in hardware, for maintaining a third communications link with a third network points of attachment concurrently with said first and second communications links being maintained; and
means, implemented in hardware, for receiving packets corresponding to a third application over the third communications link.

49. The wireless terminal of claim 48, wherein said first and third communication links are bi-directional communications links and said second communications link is a uni-directional communications link.

50. The wireless terminal of claim 49, further comprising:
means, implemented in hardware, for transmitting packets corresponding to the first application over the first orthogonal frequency division multiplexing communications link; and
means, implemented in hardware, for transmitting packets corresponding to the third application over the third communications link.

51. The wireless terminal of claim 50, wherein said first application is a data application, said second application is a downlink video broadcast application, and said third application is a voice application.

52. The wireless terminal of claim 49, wherein said means, implemented in hardware, for recovering packets corresponding to said first application includes means, implemented in hardware, for processing received orthogonal frequency division multiplexing downlink signals from the first attachment point; and
wherein said means, implemented in hardware, for recovering packets corresponding to the second application includes means, implemented in hardware, for processing orthogonal frequency division multiplexing downlink signals from the second attachment point; and
wherein said means, implemented in hardware, for receiving packets corresponding to the third application includes means, implemented in hardware, for processing CDMA downlink signals from a third attachment point.

53. The wireless terminal of claim 42, wherein said means, implemented in hardware, for maintaining first and second communications links at the same time with first and second network points of attachment includes means, implemented in hardware, for maintaining two different IP addresses, a first IP address associated with the first application and a second IP address associated with the second application.

54. A wireless terminal, comprising:
memory including link state information used to maintain first and second orthogonal frequency division multiplexing communications links at the same time with first and second network points of attachment, respectively;
a receiver configured to receive a signal including a first set of tones corresponding to the first orthogonal frequency division multiplexing communications link and a second set of tones corresponding to the second orthogonal frequency division multiplexing communications link, said first set of tones corresponding to a first carrier frequency and communicating packets corresponding to a first application, said second set of tones corresponding to a second carrier frequency and communicating packets corresponding to a second application, said first and second carriers being different;
an analog filter configured to filter the received signal including said first and second sets of tones corresponding to said first and second carriers to produce a filtered signal,
a first digital receiver chain coupled to said analog filter configured to recover packets from said first set of tones and
a second digital receiver chain coupled to said analog filter configured to recover packets from said second set of tones.

55. The wireless terminal of claim 54, wherein at least one of said first and second orthogonal frequency division multiplexing links is a bi-directional communications link, the wireless terminal further comprising:
a transmitter configured to transmit at least some packets over said bi-directional communications link.

56. The wireless terminal of claim 54, further comprising:
an analog to digital converter configured to digitize the filtered signal produced by said analog filter.

57. The wireless terminal of claim 54, wherein said first orthogonal frequency division multiplexing communications link is a bi-directional communications link and said second orthogonal frequency division multiplexing communications link is a uni-directional communications link.

58. The wireless terminal of claim 54, wherein said memory further includes:
stored state information used to maintain a third communications link with a third network points of attachment concurrently with said first and second communications links being maintained; and
wherein said receiver module further includes a third digital signal processing module configured to recover packets corresponding to a third application from signals communicated over the third communications link.

59. The wireless terminal of claim 54, wherein said state information stored in said memory corresponding to the first and second communications links includes two different IP addresses, a first IP address associated with the first application and first communications link and a second IP address associated with the second application and second communications link.

60. A non-transitory computer readable medium embodying machine executable instructions for controlling a network node to implement a communications method, the method comprising:
operating the network node to receive packets directed to a wireless terminal;
operating the network node to select one of a plurality of simultaneously maintained orthogonal frequency division multiplexing (OFDM) wireless communications links with said wireless terminal for use in routing the received packets for delivery to an application on the wireless terminal, said application being one of a plurality of different applications on said wireless terminal, different ones of said simultaneously maintained OFDM wireless communications links corresponding to different applications, operating the network node to select one of the plurality of the simultaneously maintained orthogonal frequency division multiplexing wireless communications links including selecting said one of the plurality of simultaneously maintained orthogonal frequency division multiplexing wireless communications links, based on an address assigned to the wireless terminal and used by the application to which the packets are to be delivered, when said wireless terminal is assigned multiple addresses and uses different ones of said multiple addresses for different applications; and operating the network node to communicate said packets to an attachment point corresponding to the selected orthogonal frequency division multiplexing link for delivery over the selected orthogonal frequency division multiplexing wireless link to said wireless terminal.

61. The non-transitory computer readable medium of claim 60, further embodying machine executable instructions for:
using an indicator providing application information about an application to which a packet to be delivered corresponds to select between said plurality of simultaneously maintained orthogonal frequency division multiplexing wireless communications links as part of said step of operating the network node to select one of the plurality of simultaneously maintained orthogonal frequency division multiplexing wireless communications links.

62. The non-transitory computer readable medium of claim 61, further embodying machine executable instructions for:
using information regarding application requirements to determine which of the plurality of simultaneously maintained OFDM wireless communications links to use in routing packets as part of said step of operating the network node to select one of the plurality of simultaneously maintained orthogonal frequency division multiplexing wireless communications links.

63. The non-transitory computer readable medium of claim 60, further embodying machine executable instructions for:
operating the network node to receive link quality information corresponding to the plurality of simultaneously maintained OFDM wireless communications links; and
using received link quality information to select between said plurality of simultaneously maintained links as part of said step of operating the network node to select one of the plurality of simultaneously maintained OFDM wireless communications links.

64. A non-transitory computer readable medium embodying machine executable instructions for controlling a wireless terminal to perform the steps of:
maintaining first and second orthogonal frequency division multiplexing communications links at the same time with first and second network points of attachment, respectively;
receiving a signal including a first set of tones corresponding to the first orthogonal frequency division multiplexing communications link and a second set of tones corresponding to the second orthogonal frequency division multiplexing communications link, said first set of tones corresponding to a first carrier frequency and communicating packets corresponding to a first application, said second set of tones corresponding to a second carrier frequency and communicating packets corresponding to a second application, said first and second carriers being different;
passing the received signal including said first and second sets of tones corresponding to said first and second carriers through an analog filter to produce a filtered signal, and
recovering packets from the filtered signal communicated over said first and second OFDM communications links by:
operating a first digital receiver chain to recover packets from said first set of tones and
operating a second digital receiver chain to recover packets from said second set of tones, said first and second digital receiver chains being different.

65. The non-transitory computer readable medium of claim 64, further embodying machine executable instructions for controlling the wireless terminal to perform the step of:
digitizing the filtered signal produced by said analog filter.

66. The non-transitory computer readable medium of claim 64, wherein said first orthogonal frequency division multiplexing communications link is a bi-directional communications link and said second orthogonal frequency division multiplexing communications link is a uni-directional communications link.

67. The non-transitory computer readable medium of claim 66, wherein said first and third communication links are bi-directional communications links and said second communications link is a uni-directional communications link.

68. The non-transitory computer readable medium of claim 67, wherein said first application is a data application, said second application is a downlink video broadcast application, and said third application is a voice application.

69. The non-transitory computer readable medium of claim 68 further embodying machine executable instructions for:
processing received orthogonal frequency division multiplexing downlink signals from the first attachment point as part of said step of recovering packets corresponding to said first application; and processing orthogonal frequency division multiplexing downlink signals from the second attachment point as part of said step of recovering packets corresponding to the second application includes; and
processing CDMA downlink signals from a third attachment point as part of said step of receiving packets corresponding to the third application.

70. The non-transitory computer readable medium of claim 64 further embodying instructions for:
maintaining two different IP addresses, a first IP address associated with the first application and a second IP address associated with the second application as part of said step of maintaining first and second communications links at the same time with first and second network points of attachment.

71. The communications method of claim 1,
wherein said network node is a home agent node which servers as a home agent for said wireless terminal; and
wherein said attachment point is a base station.

72. The communications method of claim 71,
wherein said network node is a router coupled to said base station; and
wherein said network node is not a base station.

73. The communications method of claim 1, wherein operating the network node to select one of a plurality of simultaneously maintained orthogonal frequency division multiplexing wireless communications links includes selecting between wireless communications links maintained between said wireless terminal and different base stations.

* * * * *